US012726102B2

(12) United States Patent
Liu et al.

(10) Patent No.: US 12,726,102 B2
(45) Date of Patent: Sep. 1, 2026

(54) CASCADE CONVERTER WITH REDUNDANT BYPASS CIRCUIT

(71) Applicant: DELTA ELECTRONICS, INC., Taoyuan City (TW)

(72) Inventors: Rufeng Liu, Shanghai (CN); Rongtang Chu, Shanghai (CN); Yongqiang Lang, Shanghai (CN)

(73) Assignee: DELTA ELECTRONICS, INC., Taoyuan City (TW)

( * ) Notice: Subject to any disclaimer, the term of this patent is extended or adjusted under 35 U.S.C. 154(b) by 178 days.

(21) Appl. No.: 18/669,497

(22) Filed: May 20, 2024

(65) Prior Publication Data

US 2024/0405661 A1 Dec. 5, 2024

(30) Foreign Application Priority Data

Jun. 1, 2023 (CN) ........................ 202310645823.9

(51) Int. Cl.
*H02M 1/00* (2007.01)
*H02M 1/32* (2007.01)
*H02M 1/36* (2007.01)

(52) U.S. Cl.
CPC ........... *H02M 1/007* (2021.05); *H02M 1/325* (2021.05); *H02M 1/36* (2013.01)

(58) Field of Classification Search
CPC ......... H02M 1/007; H02M 1/325; H02M 1/36
See application file for complete search history.

(56) References Cited

U.S. PATENT DOCUMENTS

2023/0208185 A1* 6/2023 Imanishi .................. H02J 3/32 320/108
2024/0006911 A1* 1/2024 Imanishi ................ H02J 9/068
2024/0055889 A1* 2/2024 Imanishi ............ H02M 1/0009

FOREIGN PATENT DOCUMENTS

CN 102684468 B 10/2014
CN 204316321 U 5/2015
CN 210093105 U 2/2020

* cited by examiner

*Primary Examiner* — Rafael O De Leon Domenech
(74) *Attorney, Agent, or Firm* — CKC & Partners Co., LLC

(57) ABSTRACT

The present application provides a cascade converter, including a main control system, a plurality of power modules, and a bypass circuit corresponding to each power module; where the main control system is communicatively connected to each power module, the power modules are electrically connected in turn, and any one of the power modules has at least one communicable power module, the communicable power module is an else power module communicatively connected to the power module, and the number of power modules spaced apart is within a preset value; the power module on which a fault occurs is a faulty power module, the faulty power module sends a fault signal to the main control system; the main control system generates a bypass command according to the fault signal and sends it to the faulty power module and the communicable power module of the faulty power module.

15 Claims, 11 Drawing Sheets

CASCADE CONVERTER WITH REDUNDANT BYPASS CIRCUIT

CROSS-REFERENCE TO RELATED APPLICATION

This application claims priority to Chinese Patent Application No. 202310645823.9, filed on Jun. 1, 2023, which is hereby incorporated by reference in its entirety.

TECHNICAL FIELD

The present application relates to, but is not limited to, a cascade converter.

BACKGROUND

In the field of high-voltage power electronics, the cascaded topological structure has developed rapidly in the industrial field due to possession of characteristics such as good electrical performance, easy-modularization design, fault-tolerant control and the like. With the continuous development of technology in the power electronics industry, requirements for reliable and continuous operation of a whole machine system are getting higher and higher.

There are many kinds of power electronic products based on the cascaded topological structure. In order to ensure that a system may still operate normally when a certain power module in the system is faulted, a bypass design is typically necessary for the power module, implementation solutions for bypass control thereof are various, and the bypass circuit may be a contactor, an insulated gate bipolar transistor (IGBT), a thyristor or the like, i.e., a device or a circuit that may implement a bypass power module.

SUMMARY

The present application provides a cascade converter, including a main control system, a plurality of power modules, and a bypass circuit corresponding to each power module;

- where the main control system is communicatively connected to each power module, the power modules are electrically connected in turn, and any one the power modules has at least one communicable power module, the communicable power module is an else power module communicatively connected to the power module, and the number of power modules spaced apart is within a preset value;
- when the power module is faulted, the power module on which a fault occurs is a faulty power module, the faulty power module sends a fault signal to the main control system; the main control system generates a bypass command according to the fault signal and sends it to the faulty power module and the communicable power module of the faulty power module; the communicable power module generates a first bypass signal according to the bypass command and outputs it to the faulty power module; the faulty power module controls, according to the bypass command and/or the first bypass signal, the corresponding bypass circuit to bypass itself.

BRIEF DESCRIPTION OF DRAWINGS

The accompanying drawings herein, which are incorporated in and constitute a part of the present specification, illustrate embodiments in compliance with the present application and together with the description, serve to explain the principles of the present application.

REFERENCE SIGNS

100, signal processing circuit; 200, signal control circuit; 300, main control system; 110, first transmission circuit; 120, first signal conversion circuit; 130, first level matching circuit; 140, first logic processing circuit; 150, drive circuit; 160, state detection circuit; 170, second transmission circuit; 180, second signal conversion circuit; 190, second level matching circuit; 191, third level matching circuit; 113, first signal generation circuit; 111, first transformer; 112, first rectifier circuit; 171, second signal generation circuit; 172, second transformer; 173, second rectifier circuit; 161, first comparator; 162, second comparator; 163, second logic processing circuit; 165, first switch state detection circuit; 164, first power supply state detection circuit; 166, third logic processing circuit; Cmd, bypass command; S1, first bypass signal; S2, second bypass signal; S3, third bypass signal; X1, first detection signal; X2, second detection signal; X5, fifth detection signal.

Through the above accompanying drawings, specific embodiments of the present application have been shown, which will be described hereunder in more details. These accompanying drawings and text descriptions are not intended to limit the scope of the conception of the present application in any way, but to explain the concept of the present application to those skilled in the art with reference to particular embodiments.

DESCRIPTION OF EMBODIMENTS

Exemplary embodiments will be described in detail herein, examples of which are illustrated in the accompanying drawings. The following description refers to the accompanying drawings in which the same numbers in different drawings represent the same or similar elements, unless otherwise indicated. The implementation manners described in the following exemplary embodiments do not represent all implementation manners consistent with the present application. By contrast, they are merely examples of apparatuses and methods consistent with some aspects of the present application as detailed in the appended claims.

Regarding how to quickly and reliably bypass the faulty power module, there are mainly two modes: one is based on a controllable semiconductor device (for example, a thyristor or an IGBT), and this mode has the characteristic of fast response speed, but has the disadvantages of high cost and poor reliability. For example, a communication fault, a control board fault and other per se faults cannot be bypassed. The other mode is to parallelly connect a bypass circuit at an output side of the power module, for example, a mode to parallelly connect a contactor at an output side of each power module. This mode is greatly advantageous in terms of cost, but how to increase the bypass range and reliability of this solution has become a research focus.

Figure 1A:
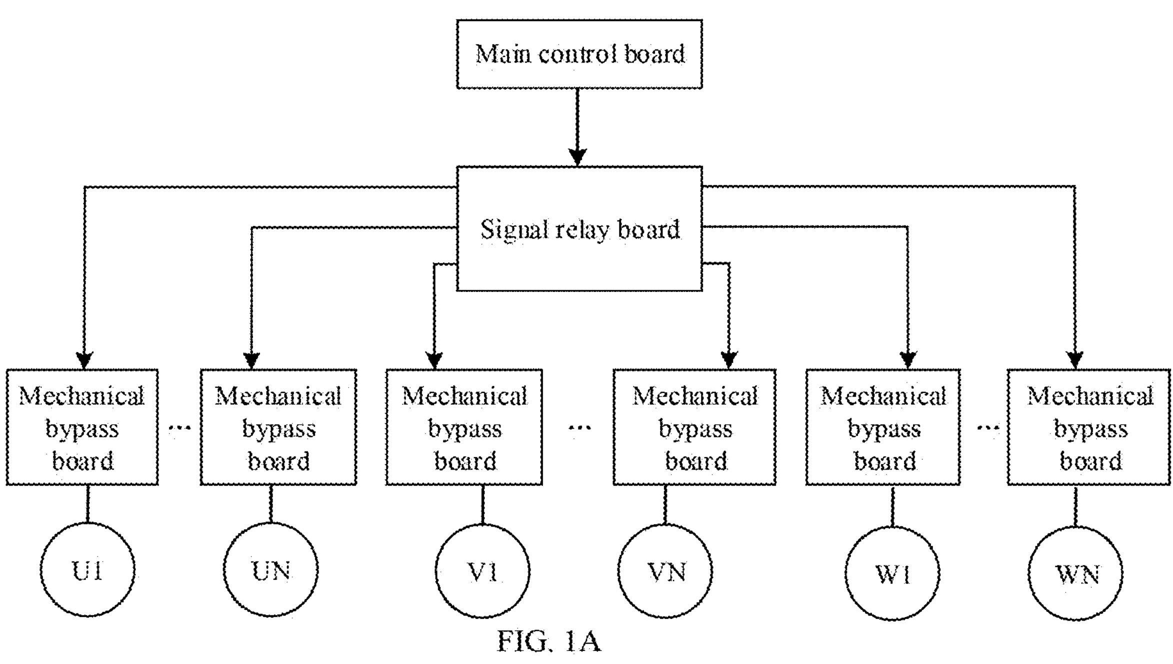
FIG. 1A is a schematic principle diagram of a cascade conversion system adopting a centralized bypass control mode.

In one technical solution, as shown in FIG. 1A, a centralized control solution is adopted. A bypass command is generated by a main control board and transmitted to a mechanical bypass board of a respective power module through a signal relay board, and the corresponding power module is bypassed by the mechanical bypass board. In FIG. 1A, U1 to UN are U-phase power modules, V1 to VN are V-phase power modules, and W1 to WN are W-phase power modules. This solution is relatively simple and has a wide bypass range, but it puts forward high requirements on the insulation system, requiring optical fiber communication or using high-voltage mechanical bypass boards. Thus the costs are high, and the reliability is poor since only one line transmits the bypass command.

Figure 1B:
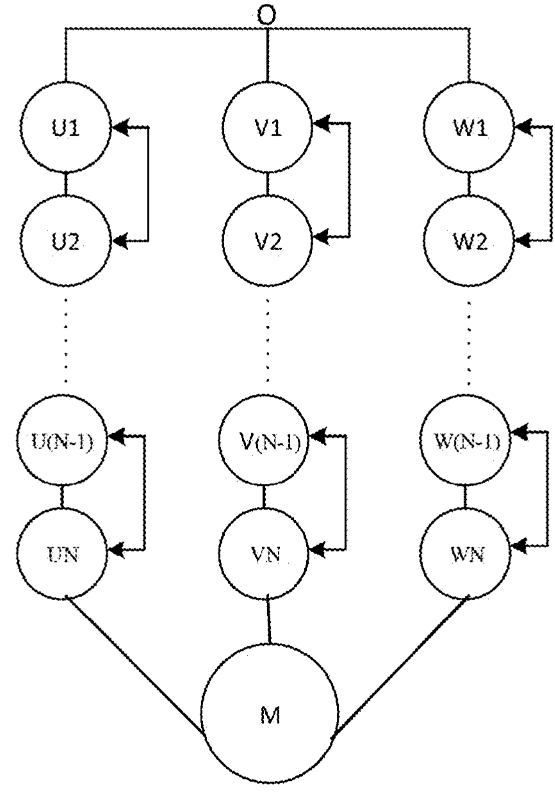
FIG. 1B and FIG. 1C are schematic principle diagrams of a cascade conversion system adopting a distributed bypass control mode.
Figure 1C:
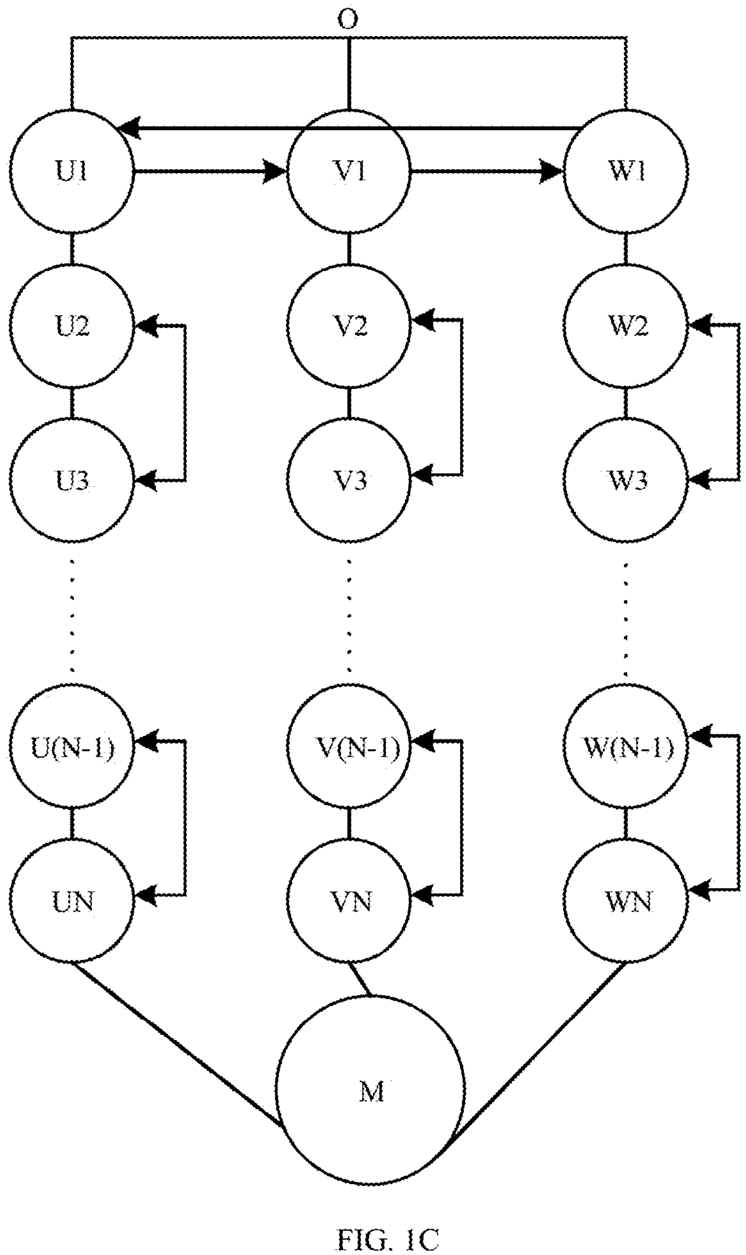

In another technical solution, as shown in FIG. 1B and FIG. 1C, a cross control solution is adopted. The cascade converter is a three-phase system. Two power modules in each phase are paired as a control group. The two power modules in the control group are referred to as a power module SM1 and a power module SM2. The power module SM1 controls a bypass circuit of the power module SM2, and the power module SM2 controls a bypass circuit of the power module SM1. It may also be that the power module SM1 supplies power to the bypass circuit of the power module SM2, and the power module SM2 supplies power to the bypass circuit of the power module SM1. This solution has the advantages of low insulation requirements and low cost. However, it is best to have an even number of power modules in each phase. If there are an odd number of power modules in each phase, as shown in FIG. 1C, a control group is formed with another power module in another phase. For example, the power module U1 and the power module V1 form a control group; also, in each control group, only one line transmits the bypass command, so the reliability is poor.

Some aspects of embodiments of the present application relate to the above considerations. In the following, the solution is introduced exemplarily in combination with some embodiments of the present application.

Figure 2:
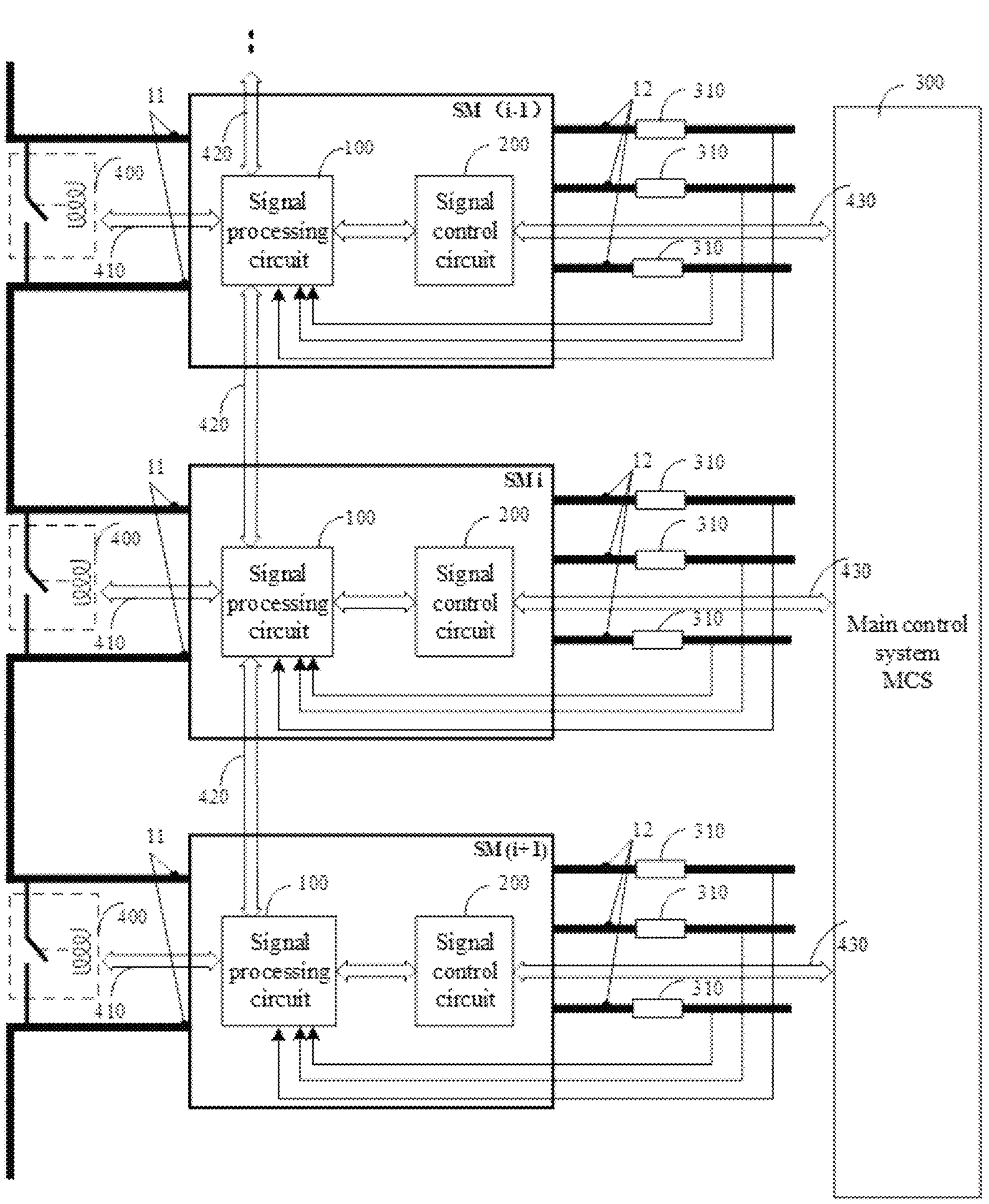
FIG. 2 is a schematic diagram of a partial circuit of a cascade converter provided by an embodiment of the present application.

As shown in FIG. 2, an embodiment of the present application provides a cascade converter, which includes a main control system 300, a plurality of power modules and a bypass circuit 400 corresponding to each power module. For convenience of description, the plurality of power modules are labeled as a power module SM1, a power module SM2, . . . , and a power module SMN, where N represents that there are N power modules.

Each power module includes a first port 11 and a second port 12, and the first ports 11 of the N power modules are sequentially cascaded. More specifically, a second terminal of the first port of the power module SM(i−1) is connected to a first terminal of the first port of the power module SM1, to realize that the first port of the power module SM(i−1) is connected in series with the first port of the power module SM1, and a second terminal of the first port of the power module SM1 is connected to a first terminal of the first port of the power module SM(i+1), to realize that the first port of the power module SM1 is connected in series with the first port of the power module SM1 (i+1), where i traverses from 2 to N−1.

Each power module is connected to the corresponding bypass circuit 400 through a signal line 410, and each power module is connected to the main control system 300 through a signal line 430. Each power module may receive information from the main control system 300, and the main control system 300 may also receive information of each power module.

Each power module is further connected to an else power module through a signal line 420, so that information interaction is performed between the power module and the else power module. The else power module connected to the power module through the signal line 420 is referred to as a communicable power module for the power module.

Any one of the power modules has at least one communicable power module, the communicable power module is an else power module communicatively connected to the power module, and the number of power modules spaced apart is within a preset value. With this arrangement, voltage level difference between the power module and its communicable power module is small, the structure of the power module is simplified, the insulation cost is reduced, and the control reliability can also be improved.

In a first example, the power module SM1 is connected to the power module SM2 through the signal line 420 (not shown in FIG. 2), and the communicable power module of the power module SM1 is the power module SM2. As shown in FIG. 2, the power module SM1 is connected to the power module SM(i−1) through the signal line 420, and the power module SM1 is also connected to the power module SM(i+1) through the signal line 420, where i is a positive integer and 1<i<n, and the communicable power modules of the power module SM1 are the power module SM(i−1) and the power module SM(i+1). The power module SMN is connected to the power module SM(N−1) through the signal line 420 (not shown in FIG. 2), and the communicable power module of the power module SMN is the power module SM(N−1). That is, the power module SM1 and the power module SMN each have one communicable power module, and the power module SM1 has two communicable power modules.

In a second example, the power module SM1 is connected to the power module SM2 and the power module SM3 through the signal lines 420, and the communicable power modules of the power module SM1 are the power module SM2 and the power module SM3. The power module SM2 is connected to the power module SM1, the power module SM3 and the power module SM4 through the signal lines 420, and the communicable power modules of the power module SM2 are the power module SM1, the power module SM3 and the power module SM4. The power module SMq is connected to the power module SM(q−1), the power module SM(q−2), the power module SM(q+1) and the power module SM(q+2) through the signal lines 420, where q is a positive integer and $2<q<(n-1)$, and the communicable power modules of the power module SMq are the power module SM(q−2), the power module SM(q−1), the power module SM(q+1) and the power module SM(q+2). The power module SM(N−1) is connected to the power module SM(N−3), the power module SM(N−2) and the power module SMN through the signal lines 420, the communicable power modules of the power module SM(N−1) are the power module SM(N−3), the power module SM(N−2) and the power module SMN, the power module SMN is connected to the power module SM(N−1) and the power module SM(N−2) through the signal lines 420, and the communicable power modules of the power module SMN are the power module SM(N−1) and the power module SM(N−2). That is, the power module SM1 and the power module SMN each have two communicable power modules, the power module SM2 and the power module SM(N−1) each have three communicable power modules, and the power module SMq has four communicable power modules.

Here, only two examples of the specific implementation manner of the communicable power module of the power module are provided, and other examples may be analogized, so they are not repeated here.

When the power module is faulted, the power module on which a fault occurs is a faulty power module. The faulty power module sends a fault signal to the main control system 300, the main control system 300 generates a bypass command according to the fault signal. The main control system 300 sends the bypass command to the faulty power module and the communicable power module of the faulty power module. The communicable power module generates a first bypass signal according to the bypass command and outputs the first bypass signal to the faulty power module. According to the bypass command and/or the first bypass signal, the faulty power module controls a corresponding bypass circuit 400 to bypass itself.

An example is taken where the communicable power modules of the power module SM1 are the power module SM(i−1) and the power module SM(i+1), when the power module SM1 is a faulty power module, the power module SM1 sends a fault signal to the main control system 300, and the main control system 300 generates a bypass command according to the fault signal, and the main control system sends the bypass command to the power module SM1, the power module SM(i−1) and the power module SM(i+1). The power module SM(i−1) generates a first bypass signal according to the bypass command and outputs the first bypass signal to the power module SM1. The power module SM(i+1) generates a first bypass signal according to the bypass command and outputs the first bypass signal to the power module SM1. The power module SM1 controls the corresponding bypass circuit according to the bypass command and/or two first bypass signals, to realize that the faulty power module is bypassed.

An example is taken where the communicable power module of the power module SM1 is the power module SM2, when the power module SM1 is a faulty power module, the power module SM1 sends a fault signal to the main control system 300, the main control system 300 generates a bypass command according to the fault signal, and the main control system 300 sends the bypass command to the power module SM1 and the power module SM2. The power module SM2 generates a first bypass signal according to the bypass command and outputs the first bypass signal to the power module SM1. The power module SM1 controls the corresponding bypass circuit according to the bypass command or one first bypass signal, to realize that the faulty power module is bypassed.

In the above technical solution, the faulty power module can receive the bypass command and the first bypass signal(s), and the faulty power module controls the bypass circuit corresponding thereto according to the bypass command and/or the first bypass signal(s), to realize that the faulty power module is bypassed. Since not only the bypass command but also at least one first bypass signal may be received, the bypass reliability can be improved. Even if a fault occurs on one of bypass command transmission paths, for example, if there is a communication fault in the power module on the transmission path, the bypass signal can still be transmitted over other bypass command transmission paths, to bypass the faulty power module. The number of power modules for the cascade converter is not limited, single-phase or three-phase systems are acceptable.

With continued reference to FIG. 2, each power module further includes a signal control circuit 200 and a signal processing circuit 100. The signal control circuit 200 is electrically connected to the signal processing circuit 100, the signal processing circuit 100 is electrically connected to the bypass circuit, the signal control circuit 200 is communicatively connected to the main control system 300, and signal processing circuits 100 in two adjacent power modules are electrically connected. That is, in each power module, information interaction may be performed between the signal control circuit 200 and the signal processing circuit 100, information interaction may be performed between the signal processing circuit 100 and the bypass circuit, and information interaction may be performed between the signal control circuit 200 and the main control system 300. Information interaction is performed between the signal processing circuits 100 in the two power modules.

A power supply end of the signal processing circuit 100 of the power module is connected to the second port 12 of the power module, and the second port 12 of the power module supplies power to the signal processing circuit 100. The second port 12 of the power module is provided with a fuse structure 310, one end of the fuse structure 310 is connected to the second port 12, and the other end of the fuse structure 310 is connected to the power supply end of the signal processing circuit 100 of the power module, to ensure the reliable power supply of the signal processing circuit 100. The power supply end of the signal processing circuit 100 may be of any two-phase voltage of the second port or any three-phase voltage of the second port.

After receiving the fault signal, the main control system 300 generates a bypass command according to the fault signal. The main control system 300 sends the bypass command to the faulty power module and the communicable power module of the faulty power module.

The signal control circuit 200 of the communicable power module of the faulty power module transmits the bypass command to the signal processing circuit 100 of the communicable power module, and the signal processing circuit 100 of the communicable power module of the faulty power module generates a first bypass signal and transmits the first bypass signal to the signal processing circuit 100 of the faulty power module.

The signal control circuit 200 of the faulty power module transmits the bypass command to the signal processing circuit 100 of the faulty power module, and the signal processing circuit 100 of the faulty power module generates a second bypass signal according to the bypass command. The signal processing circuit 100 of the faulty power module generates a bypass drive signal according to the first bypass signal or the second bypass signal.

Description is made hereunder by taking an example where the specific implementation manner of the communicable power module of each power module is as the first example.

Figure 3:
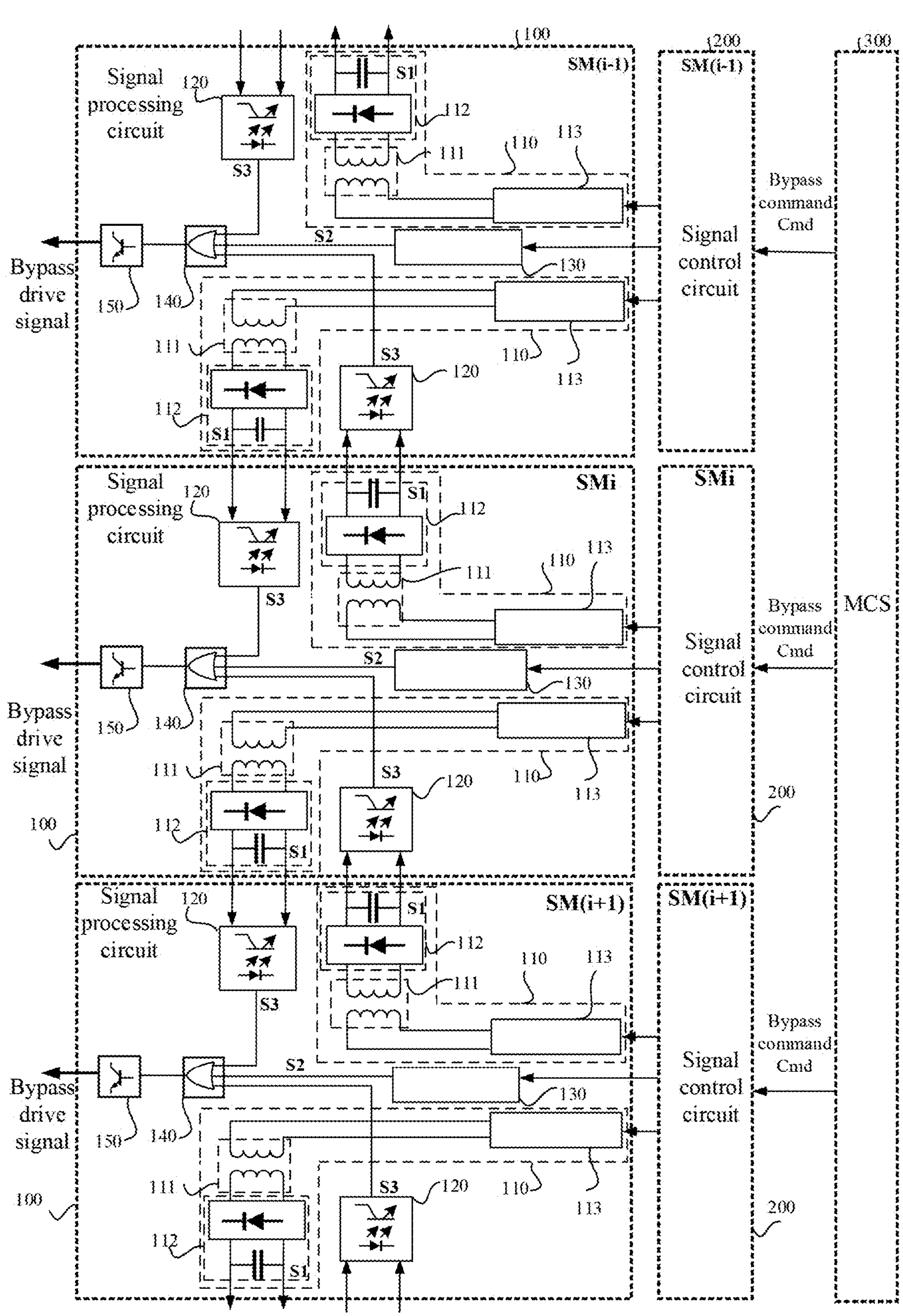
FIG. 3 is a schematic diagram of a partial circuit of a cascade converter provided by another embodiment of the present application.

As shown in FIG. 3, when a fault occurs on the power module SM1, the main control system 300 sends a bypass command Cmd to the power module SM(i−1), the power module SM1 and the power module SM(i+1). There are three bypass command transmission paths, so that the signal processing circuit 100 of the power module SM1 may receive three bypass signals.

Bypass command transmission path 1: the main control system 300 transmits the bypass command Cmd to the signal control circuit 200 of the power module SM1 through the optical fiber, and after the bypass command Cmd is subjected to decoding processing and/or isolation from the signal control circuit 200 of the power module SM1, it is transmitted to the signal processing circuit 100 of the power module SM1 by the signal control circuit 200 of the power module SM1 for processing and then outputting the second bypass signal S2, and the bypass circuit 400 is driven based on the second bypass signal S2.

Bypass command transmission path 2: the main control system 300 transmits the bypass command Cmd to the signal control circuit 200 of the power module SM(i−1) through the optical fiber, and the bypass command Cmd is subjected to decoding processing and/or isolation from the signal control circuit 200 of the power module SM(i−1) and then output to the signal processing circuit 100 of the power module SM(i−1); the signal processing circuit 100 of the power module SM(i−1) outputs a first bypass signal S1 after conversion and/or isolation processing, and the signal processing circuit 100 of the power module SM(i−1) transmits the first bypass signal S1 to the signal processing circuit 100 of the power module SM1, the signal processing circuit 100 of the power module SM1 processes the first bypass signal S1 and then outputs the third bypass signal S3, and the bypass circuit 400 is driven based on the third bypass signal S3.

Bypass command transmission path 3: the main control system 300 transmits the bypass command Cmd to the signal control circuit 200 of the power module SM(i+1) through the optical fiber, and the bypass command Cmd is subjected to decoding processing and/or isolation from the signal control circuit 200 of the power module SM(i+1) and then output to the signal processing circuit 100 of the power module SM(i+1), the signal processing circuit 100 of the power module SM(i+1) outputs a first bypass signal S1 after conversion and/or isolation processing, and the signal processing circuit 100 of the power module SM(i+1) transmits the first bypass signal S1 to the signal processing circuit 100 of the power module SM1, the signal processing circuit 100 of the power module SM1 processes the first bypass signal S1 and then outputs the third bypass signal S3, and the bypass circuit 400 is driven based on the third bypass signal S3.

When a fault occurs on the power module SM1, the main control system 300 sends the bypass command Cmd to the power module SM1 and the power module SM2. There are two bypass command transmission paths, so that the signal processing circuit 100 of the power module SM1 may receive two bypass signals. A first bypass command transmission path is similar to the bypass command transmission path 1 when a fault occurs on the power module SM1, and details will not be repeated here. A second bypass command transmission path is similar to the bypass command transmission path 3 when a fault occurs on the power module SM1, and details will not be repeated here.

When a fault occurs on the power module SMN, the main control system 300 sends the bypass command Cmd to the power module SM(N−1) and the power module SMN. There are two bypass command transmission paths, so that the signal processing circuit 100 of the power module SMN may receive two bypass signals. A first bypass command transmission path is similar to the bypass command transmission path 1 when a fault occurs on the power module SM1, and details will not be repeated here. A second bypass command transmission path is similar to the bypass command transmission path 2 when a fault occurs on the power module SM1, and details will not be repeated here.

The bypass command transmission paths when the power module SM1 and the power module SMN each have two communicable power modules, the power module SM2 and the power module SM(N−1) each have three communicable power modules, and the power module SMq has four communicable power modules, are similar to the bypass command transmission paths when the power module SM1 and the power module SMN each have one communicable power module, and the power module SM1 each has two communicable power modules, and details will not be repeated here.

The bypass command transmission paths in the case that the specific implementation manner of the communicable power module for each power module is the second example or other examples, are similar to the bypass command transmission paths in the first example, and details will not be repeated here.

In the above technical solution, each faulty power module may receive at least 2 bypass signals, and the bypass circuit 400 is driven based on the 2 bypass signals, so that the bypass reliability can be improved.

In each power module, the signal control circuit 200 needs to realize the following functions: firstly, receive the bypass command sent from the main control system 300 to bypass the power module, and transmit the bypass command to the signal processing circuit 100 of the power module after the bypass command is subjected to decoding processing and/or isolation; secondly, receive the bypass command sent from the main control system 300 to bypass an else power module, and the power module is a communicable power module of the else power module, and transmit the bypass command to the signal processing circuit 100 of the power module after the bypass command is subjected to decoding processing and/or isolation; thirdly, detect an operating state of the power module and upload the state of the power module to the main control system 300, so that the main control system 300 generates a bypass command when it is determined that the power module has a fault that may be eliminated by bypassing the power module.

In each power module, the signal processing circuit 100 needs to realize the following functions: firstly, receive the bypass command, sent by the signal control circuit 200 of the power module, to bypass the power module; secondly, receive the first bypass signal, sent from the signal processing circuit 100 of an else power module, to bypass the power module; thirdly, receive the bypass command, sent from the signal control circuit 200 of the power module, to bypass an else power module, and output a first bypass signal S1 after the bypass command is processed, and transmit the first bypass signal S1 to the signal processing circuit 100 of the else power module, the power module is a communicable power module of the else power module; fourthly, the signal processing circuit 100 is configured to drive the bypass circuit 400 of the power module.

Based on the above description, the specific structure of the signal processing circuit 100 is designed. Here, the structure of the signal processing circuit 100 is only exemplarily described, and is not used to limit the circuit structure of the signal processing circuit 100.

As shown in FIG. 3, the signal processing circuit 100 of each power module includes a first transmission circuit 110, a first signal conversion circuit 120 and a first level matching circuit 130. The first level matching circuit 130 is connected to the signal control circuit 200 of the power module, and the first level matching circuit 130 is configured to perform level matching on the bypass command transmitted by the signal control circuit 200 of the power module and output a second bypass signal S2. An else power module is a communicable power module of the power module, and the first signal conversion circuit 120 in the signal processing circuit 100 of the power module is connected to the signal processing circuit 100 of the else power module, more specifically, the first signal conversion circuit 120 in the signal processing circuit 100 of the power module is connected to the first transmission circuit 110 in the signal processing circuit 100 of the else power module. The first signal conversion circuit 120 is configured to receive the first bypass signal S1 for bypassing the power module output by the signal processing circuit 100 of the else power module, and the first signal conversion circuit 120 is configured to perform signal conversion on the first bypass signal S1 for bypassing the power module, to output the third bypass signal S3 for bypassing the power module. The second bypass signal S2 output by the first level matching circuit 130 and the third bypass signal S3 output by the first signal conversion circuit 120 are used for driving the bypass circuit 400 corresponding to the power module to bypass the power module.

The power module is a communicable power module of the else power module. The first transmission circuit 110 in the signal processing unit 100 of the power module is connected to the signal control circuit 200 of the power module. The first transmission circuit 110 is configured to perform isolation processing on the bypass command for bypassing the else power module transmitted by the signal control circuit 200 of the power module, to output the first bypass signal S1 for bypassing the else power module, and transmit the first bypass signal S1 for bypassing the else power module to the signal processing circuits 100 of the else power module, so that the corresponding bypass circuit 400 is driven by the signal processing circuit 100 of the else power module, to bypass the else power module.

The number of first signal conversion circuits 120 is determined according to the number of communicable power modules of the power module. Each first signal conversion circuit 120 performs processing on the first bypass signal S1 sent by the first transmission circuit 110 in one communicable power module, or the same first signal conversion circuit 120 may perform processing on the first bypass signals S1 sent by the first transmission circuits 110 in all communicable power modules. The number of first transmission circuits 110 is determined according to the number of communicable power modules of the power module as other power modules.

The structure within each power module will be described below by taking an example where the specific implementation manner of the communicable power module of the power module is as the first example.

The power module SM1 has two communicable power modules, namely the power module SM(i−1) and the power module SM(i+1). In addition, the power module SM1 is also a communicable power module of the power module SM(i+1) and the power module SM(i−1).

As shown in FIG. 3, since the power module SM1 has two communicable power modules, the signal processing circuit 100 includes two first signal conversion circuits 120. One of the first signal conversion circuits 120 is connected to the first transmission circuit 110 of the signal processing circuit 100 of the power module SM(i−1), the first signal conversion circuit 120 receives the first bypass signal S1 transmitted by the first transmission circuit 110 of the signal processing circuit 100 of the power module SM(i−1), and the first bypass signal S1 is used for bypassing the power module SM1. The other one of the first signal conversion circuits 120 is connected to the first transmission circuit 110 of the signal processing circuit 100 of the power module SM(i+1), and the first signal conversion circuit 120 receives the first bypass signal S1 transmitted by the first transmission circuit 110 of the signal processing circuit 100 of the power module SM(i+1), and the first bypass signal S1 is used for bypassing the power module SM1. In this way, the power module SM1 receives two first bypass signals S1.

Figure 4:
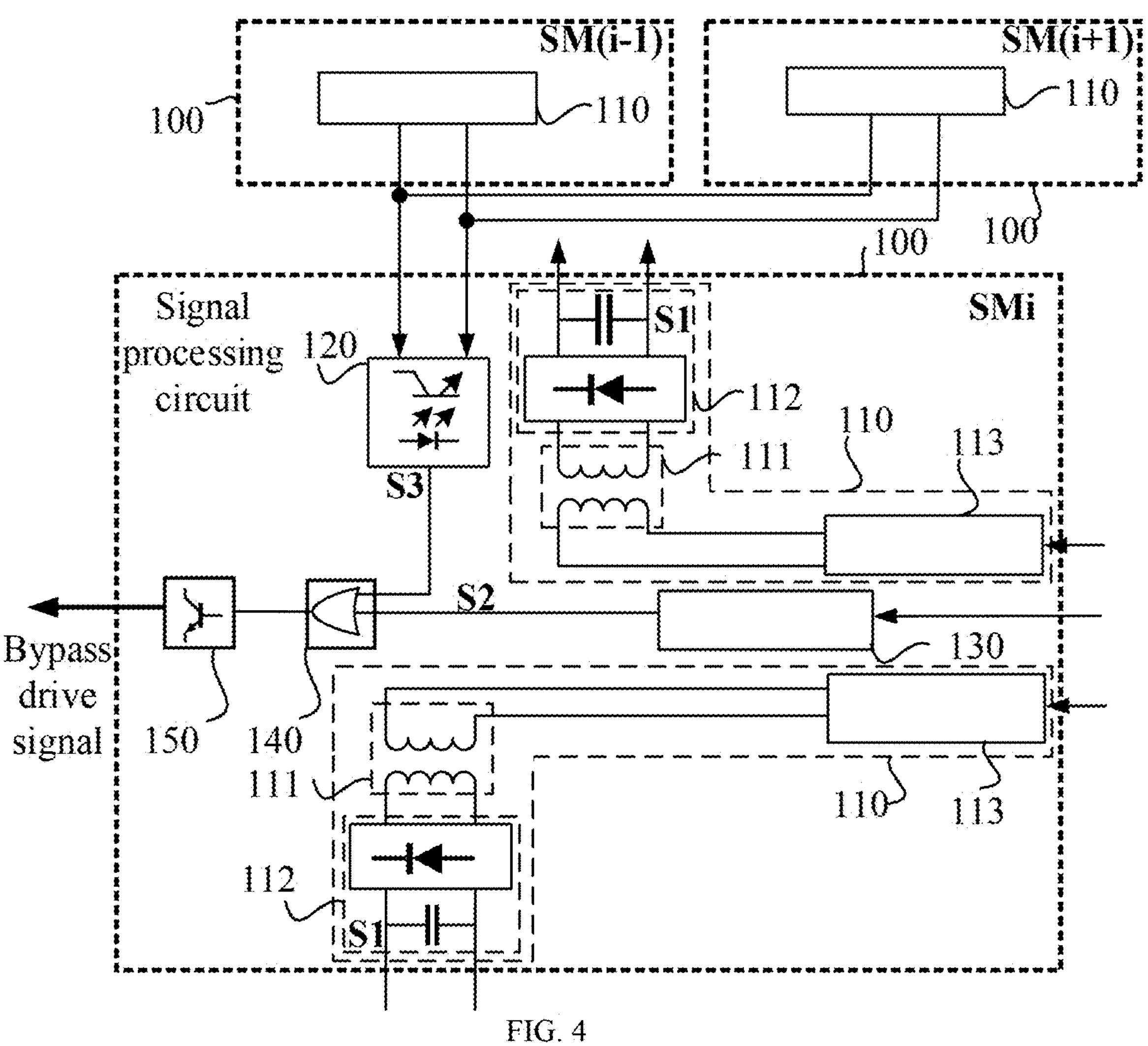
FIG. 4 is a schematic diagram of a partial circuit of a cascade converter provided by yet another embodiment of the present application.

The signal processing circuit 100 of the power module SM1 shown in FIG. 4 is different from the signal processing circuit 100 of the power module SM1 shown in FIG. 3 in that in FIG. 4, only one first signal conversion circuit 120 is included, the first signal conversion circuit 120 is connected to the first transmission circuit 110 of the signal processing circuit 100 of the power module SM(i−1), and the first signal conversion circuit 120 is also connected to the first transmission circuit 110 of the signal processing circuit 100 of the power module SM(i+1). The first signal conversion circuit 120 receives both the first bypass signal S1 transmitted by the first transmission circuit 110 of the signal processing circuit 100 of the power module SM(i−1) and the first bypass signal S1 transmitted by the first transmission circuit 110 of the signal processing circuit 100 of the power module SM(i+1). It should be noted here that in order to reflect the relationship between the first transmission circuits 110 in the power modules SM(i+1) and SM(i−1) and the power module SM1, only the first transmission circuits 110 in the power modules SM(i+1) and SM(i−1) are shown, and other circuits in the power modules SM(i+1) and SM(i−1) are not shown.

With continued reference to FIG. 3, since the power module SM1 is a communicable power module of the power module SM(i+1) and the power module SM(i−1), the signal processing circuit 100 includes two first transmission circuits 110, one of the first transmission circuits 110 is connected to the first signal conversion circuit 120 in the signal processing circuit 100 of the power module SM(i−1), and transmits the first bypass signal S1 to the first signal conversion circuit 120 in the signal processing circuit 100 of the power module SM(i−1), where the first bypass signal S1 is used for bypassing the power module SM(i−1). The other one of the first transmission circuits 110 is connected to the first signal conversion circuit 120 in the signal processing circuit 100 of the power module SM(i+1), and transmits the first bypass signal S1 to the first signal conversion circuit

120 in the signal processing circuit 100 of the power module SM(i+1), where the first bypass signal S1 is used for bypassing the power module SM(i+1).

Figure 5:
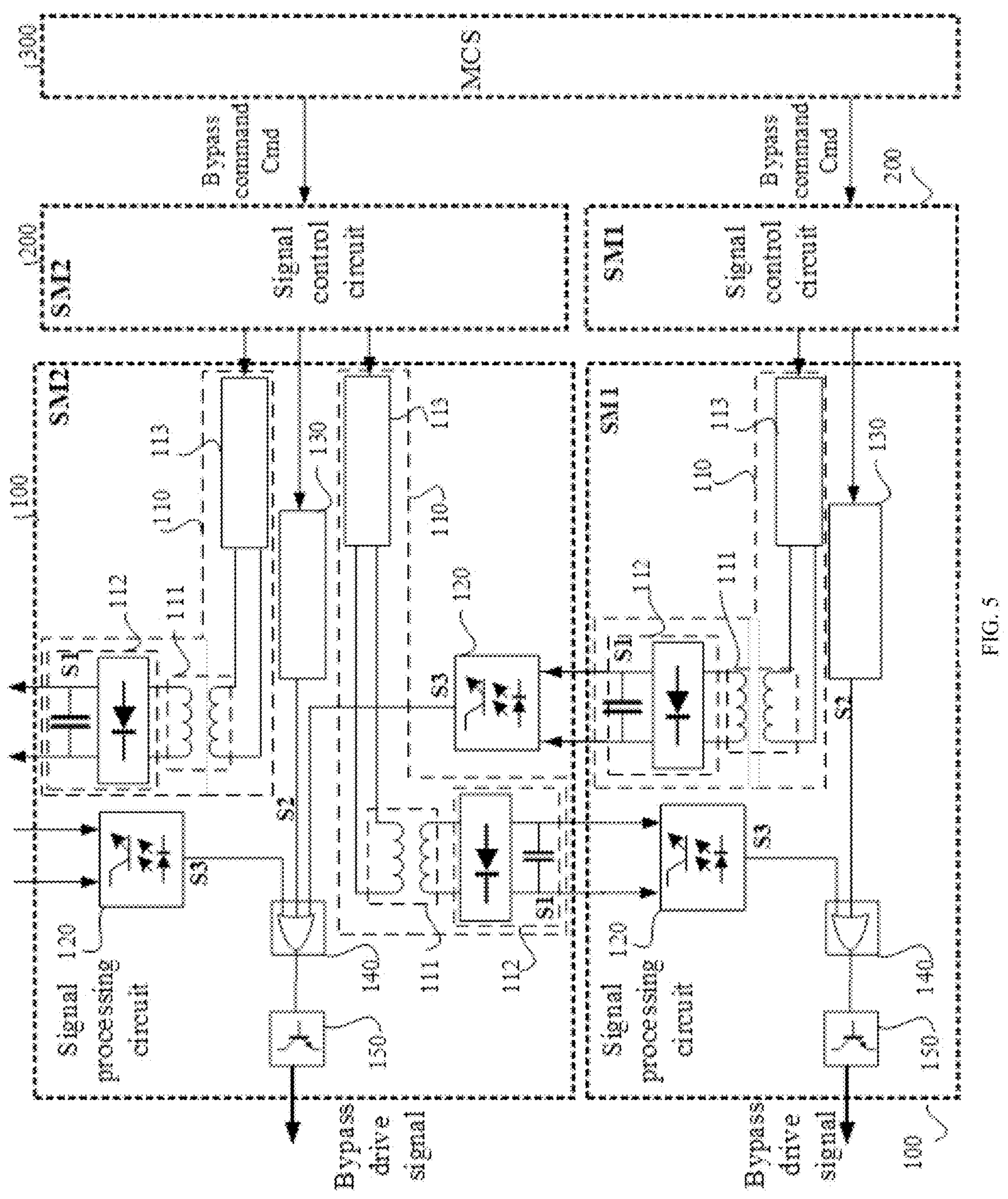
FIG. 5 is a schematic diagram of a partial circuit of a cascade converter provided by yet another embodiment of the present application.

As shown in FIG. 5, since the power module SM1 is only a communicable power module of the power module SM2, the signal processing circuit 100 includes one first transmission circuit 110. The first transmission circuit 110 is connected to the first signal conversion circuit 120 in the signal processing circuit 100 of the power module SM2, and transmits a first bypass signal S1 to the first signal conversion circuit 120 in the signal processing circuit 100 of the power module SM2, where the first bypass signal S1 is used for bypassing the power module SM2. Since the power module SM1 has a communicable power module which is only the power module SM2, the signal processing circuit 100 includes one first signal conversion circuit 120. The first signal conversion circuit 120 is connected to the first transmission circuit 110 of the signal processing circuit 100 of the power module SM2, and the first signal conversion circuit 120 receives the first bypass signal S1 transmitted by the first transmission circuit 110 of the signal processing circuit 100 of the power module SM2, and the first bypass signal S1 is used for bypassing the power module SM1.

Since the power module SMN is only a communicable power module of the power module SM(N−1), the signal processing circuit 100 includes one first transmission circuit. The first transmission circuit 110 is connected to the first signal conversion circuit 120 in the signal processing circuit 100 of the power module SM(N−1), and transmits the first bypass signal S1 to the first signal conversion circuit 120 in the signal processing circuit 100 of the power module SM(N−1), where the first bypass signal S1 is used for bypassing the power module SM(N−1). Since the power module SMN has a communicable power module which is only the power module SM(N−1), the signal processing circuit 100 includes one first signal conversion circuit 120. The first signal conversion circuit 120 is connected to the first transmission circuit 110 of the signal processing circuit 100 of the power module SM(N−1), and the first signal conversion circuit 120 receives the first bypass signal S1 transmitted by the first transmission circuit 110 of the signal processing circuit 100 of the power module SM(N−1), and the first bypass signal S1 is used for bypassing the power module SMN.

More specifically, as shown in FIG. 3 to FIG. 5, the first transmission circuit 110 includes a first signal generation circuit 113, a first transformer 111 and a first rectifier circuit 112. An input end of the first signal generation circuit 113 serves as an input end of the first transmission circuit 110, and is used for receiving the bypass command for bypassing an else power module output by the signal control circuit 200 of the power module. An output end of the first signal generation circuit 113 is connected to a primary side of the first transformer 111, a secondary side of the first transformer 111 is connected to an input end of the first rectifier circuit 112, and an output end of the first rectifier circuit 112 is an output end of the first transmission circuit 110, used for outputting the first bypass signal S1 for bypassing an else power module.

The first signal generation circuit 113 is configured to generate an alternate current signal, which may be a sinusoidal signal or a pulse signal. The first transformer 111 is configured to isolate the alternate current signal, and the first rectifier circuit 112 is configured to rectify the alternate current signal into a direct current signal for outputting. For the first signal generation circuit 113 and the first rectifier circuit 112, the existing structures may be used, which are not described here. In this way, the isolation of the bypass command may be realized.

More specifically, the first signal generation circuit 113 outputs a first intermediate signal when receiving the bypass command, and the first intermediate signal is isolated by the first transformer 111 and processed by the first rectifier circuit 112, then the first bypass signal S1 is output. The first signal generation circuit 113 outputs a second intermediate signal when not receiving the bypass command, and the second intermediate signal is isolated by the first transformer 111 and processed by the first rectifier circuit 112, then a default signal is output.

The first intermediate signal and the second intermediate signal have different amplitudes and/or frequencies, and after the first intermediate signal and the second intermediate signal are processed by the first rectifier circuit 112, direct current signals with different voltages may be output. After passing through the first signal conversion circuit 120, a high-level logic signal or a low-level logic signal may be output. The first signal conversion circuit 120 is specifically a level conversion circuit. For example, the first signal conversion circuit 120 outputs the high-level logic signal when the first transmission circuit 110 receives the bypass command. The first signal conversion circuit 120 outputs the low-level logic signal when the first transmission circuit 110 does not receive the bypass command. For another example, the first signal conversion circuit 120 outputs the low-level logic signal when the first transmission circuit 110 receives the bypass command. The first signal conversion circuit 120 outputs the high-level logic signal when the first transmission circuit 110 does not receive the bypass command.

Each signal processing circuit 100 further includes one drive circuit 150 or more drive circuits 150, and the drive circuit 150 is configured to generate a bypass drive signal based on the bypass signal, to drive the bypass circuit 400 to bypass the power module. With continued reference to FIG. 3 to FIG. 5, when the signal processing circuit 100 includes only one drive circuit 150, the signal processing circuit 100 further includes a first logic processing circuit 140. An input end of the first logic processing circuit 140 is connected to an output end of the first signal conversion circuit 120 for receiving the third bypass signal S3. The input end of the first logic processing circuit 140 is also connected to an output end of the first level matching circuit 130 for receiving the second bypass signal S2. The first logic processing circuit 140 is configured to perform logic operation on the second bypass signal S2 and the third bypass signal S3 and then output a first trigger signal. An input end of the drive circuit 150 is connected to an output end of the first logic processing circuit 140, and the drive circuit 150 is configured to output the bypass drive signal under control of the first trigger signal. The first logic processing circuit 140 fuses the second bypass signal S2 and the third bypass signal S3 into the first trigger signal, and the first trigger signal controls the drive circuit to output the bypass drive signal, so that the number of drive circuits may be reduced.

More specifically, the number of input ends of the first logic processing circuit 140 is determined according to the number of first signal conversion circuits 120. As illustrated in FIG. 5, when the signal processing circuit 100 of the power module SM1 has one first signal conversion circuit 120, the first logic processing circuit 140 includes two input ends, a first input end receives the second bypass signal S2 and a second input end receives the third bypass signal S3. When the signal processing circuit 100 of the power module SM2 has two first signal conversion circuits 120, the first logic processing circuit 140 includes three input ends, a first input end receives the second bypass signal S2, and remaining two input ends each receive one third bypass signal S3.

The first logic processing circuit 140 includes a first OR gate circuit or a first NAND gate circuit. When the second bypass signal S2 or the third bypass signal S3 is a high-level logic signal indicating that the bypass command is received, the first logic processing circuit 140 is the first OR gate circuit. When the second bypass signal S2 or the third bypass signal S3 is a low-level logic signal indicating that the bypass command is received, the first logic processing circuit 140 is the first NAND gate circuit.

Figure 6:
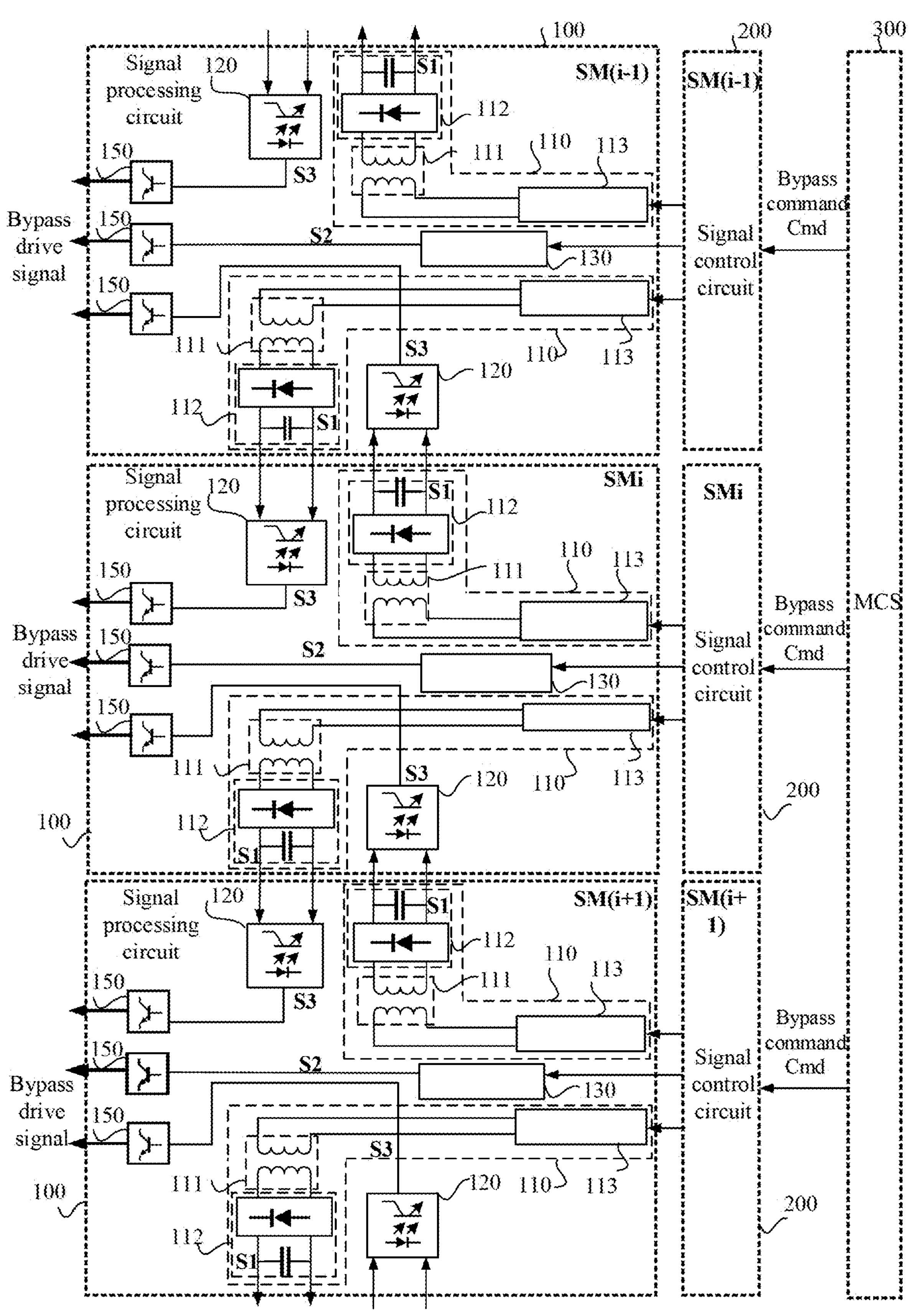
FIG. 6 is a schematic diagram of a partial circuit of a cascade converter provided by an embodiment of the present application.

As shown in FIG. 6, when the signal processing circuit 100 includes a plurality of drive circuits 150, the output end of the first signal conversion circuit 120 is connected to an input end of one drive circuit 150, and the drive circuit 150 outputs the bypass drive signal under control of the third bypass signal S3, an output end of the first level matching circuit 130 is connected to the input end of one drive circuit 150, and the drive circuit 150 is configured to output the bypass drive signal under control of the second bypass signal S2. Each signal processing circuit 100 receives the second bypass signal S2 and the third bypass signal S3, and the second bypass signal S2 and the third bypass signal S3 may control the plurality of drive circuits, and the bypass circuit 400 is driven by the plurality of drive circuits, so that the bypass reliability can be improved.

In order to adapt to different examples of communicable power modules, for example, when the power module SM1 and the power module SMN each have two communicable power modules, the power module SM2 and the power module SM(N−1) each have three communicable power modules, and the power module SMq has four communicable power modules, the number of first transmission circuits 110 and first signal conversion circuits 120 in the signal processing circuit 100 of the power module may be adjusted. For example, if the power module SMq has four communicable power modules, the power module SMq is internally provided with four first signal conversion circuits 120 for receiving the first bypass signals S1 transmitted by the four communicable power modules. If the power module SMq is a communicable power module of four power modules, the power module is internally configured with four first transmission circuits 110 for transmitting the corresponding first bypass signals S1 to the four power modules.

In the above technical solution, the signal processing circuit 100 includes the first transmission circuit 110 and the first signal conversion circuit 120. The number of first transmission circuits 110 and first signal conversion circuits 120 is adjusted to adapt to the situation where each power module corresponds to a different number of communicable power modules. Signal isolation is realized by the first transmission circuit 110, and the first signal conversion circuit 120 is further configured for signal transmission to ensure the reliability of transmission, and signal isolation can avoid noise introduction.

A bypass control method of the cascade converter is described below by taking an example where the specific implementation manner of the communicable power module of the power module is as the first example, and specifically includes the following steps:

S101, the main control system 300 receives fault information uploaded by all power modules with faults in a system.

S102, the main control system 300 judges whether each power module has a fault that may be eliminated by bypassing the power module, and if not, step S101 is executed; if there is a fault that may be eliminated by bypassing the power module, step S103 is executed;

S103, the main control system 300 judges whether the power module is located at two ends of the cascade converter, and if not, S104 is executed; if yes, a bypass control method when a fault occurs on the power module SM1 or a bypass control method when a fault occurs on the power module SMN is executed;

S104, the main control system 300 sends the bypass command Cmd for bypassing the power module SM1 to the power module SM(i−1), the power module SM1 and the power module SM(i+1), and then S105, S109 and S113 are simultaneously executed, where i is a positive integer, and $1<i<N$;

S105, after being subjected to decoding processing and/or isolation from the signal control circuit 200 of the power module SM(i−1), the bypass command Cmd is transmitted to the signal processing circuit 100 of the power module SM(i−1);

S106, the first signal generation circuit 113 in the signal processing circuit 100 of the power module SM(i−1) generates the alternate current signal, and the alternate current signal, after being isolated by a single-level or a multi-level transformer, is converted into the direct current signal by the first rectifier circuit 112, and the direct current signal is output as the first bypass signal S1;

S107, the signal processing circuit 100 of the power module SM(i−1) transmits the first bypass signal S1 to the signal processing circuit 100 of the power module SM1 via a signal line;

S108, the signal processing circuit 100 of the power module SM1 performs signal conversion processing on the first bypass signal S1 through the first signal conversion circuit 120 to output the third bypass signal S3, and then step S115 is executed;

S109, the bypass command Cmd, after being subjected to decoding processing and/or isolation from the signal control circuit 200 of the power module SM(i+1), is transmitted to the signal processing circuit 100 of the power module SM(i+1);

S110, the first signal generation circuit 113 in the signal processing circuit 100 of the power module SM(i+1) generates the alternate current signal, and the alternate current signal, after being isolated by a single-level or multi-level transformer, is converted into the direct current signal by the first rectifier circuit 112, and the direct current signal is output as the first bypass signal S1;

S111, the signal processing circuit 100 of the power module SM(i+1) transmits the first bypass signal S1 to the signal processing circuit 100 of the power module SM1 via a signal line;

S112, the signal processing circuit 100 of the power module SM1 performs signal conversion processing on the first bypass signal S1 through the first signal conversion circuit 120 to output the third bypass signal S3, and then step S115 is executed;

S113, the signal control circuit 200 of the power module SM1 receives the bypass command Cmd for bypassing the power module SM1 sent by the main control system 300, and transmits the bypass command Cmd to the signal processing circuit 100 of the power module SM1 after the bypass command Cmd is subjected to decoding processing and/or isolation;

S114, the signal processing circuit 100 of the power module SM1 performs level matching and other processing, and then outputs the second bypass signal S2;

S115, the third bypass signals S3 output in steps S108 and S112 and the second bypass signal S2 output in S114 are processed by the first logic processing circuit and then output to the drive circuit 150; it may also be that the second bypass signal S2 directly controls the corresponding drive circuit 150, and each third bypass signal S3 directly controls the corresponding drive circuit 150, so that the drive circuits 150 output bypass drive signals to drive the bypass circuit 400 of the power module SM1 to close, and the power module SM1 is bypassed.

The bypass control method when a fault occurs on the power module SM1 specifically includes the following steps:

S116, the main control system 300 sends the bypass command Cmd to the power module SM1 and the power module SM2;

S117, the signal control circuit 200 of the power module SM2 performs decoding processing and/or isolation processing on the bypass command Cmd and then transmits it to the signal processing circuit 100 of the power module SM2;

S118, the first signal generation circuit 113 in the signal processing circuit 100 of the power module SM2 generates the alternate current signal, and the alternate current signal, after being isolated by a single-level or multi-level transformer, is converted into the direct current signal by the first rectifier circuit 112, and the direct current signal is output as the first bypass signal S1;

S119, the signal processing circuit 100 of the power module SM2 transmits the first bypass signal S1 to the signal processing circuit 100 of the power module SM1 via a signal line;

S120, the signal processing circuit 100 of the power module SM1 performs signal conversion processing on the first bypass signal S1 through the first signal conversion circuit 120 to output the third bypass signal S3, and then step S123 is executed;

S121, the signal control circuit 200 of the power module SM1 receives the bypass command Cmd for bypassing the power module SM1 sent by the main control system 300, and transmits the bypass command Cmd to the signal processing circuit 100 of the power module SM1 after the bypass command Cmd is subjected to decoding processing and/or isolation processing;

S122, the signal processing circuit 100 of the power module SM1 performs level matching and other processing, and then outputs the second bypass signal S2;

S123, the third bypass signal S3 output in step S120 and the second bypass signal S2 output in S122 are processed by the first logic processing circuit and then output to the drive circuit 150; it may also be that the second bypass signal S2 directly controls the corresponding drive circuit 150, and the third bypass signal S3 directly controls the corresponding drive circuit 150, so that the drive circuits 150 output bypass drive signals to drive the bypass circuit 400 of the power module SM1 to close, and the power module SM1 is bypassed.

The bypass control method when a fault occurs on the power module SMN is similar to that when the fault occurs on the power module SM1, only the power module SM1 needs to be replaced by the power module SMN, and the power module SM2 needs to be replaced by the power module SM(N−1), which will not be repeated here.

The bypass solution of the power module SM1 is described in detail above, but in order to improve the reliability of the bypass of the faulty power module, in most cases, the main control system 300 generally needs to know whether the bypass circuit 400 has been reliably closed, and accordingly determines whether to carry out related operations to start/stop the system. For this reason, the solution of how to transmit the state of the feedback signal of the bypass circuit 400 to the main control system 300 is described below.

With continued reference to FIG. 2, any one of the power modules receives the feedback signal sent by the corresponding bypass circuit 400 through the signal line 410 and sends the feedback signal to the main control system 300 through the signal line 430, and the main control system 300 makes a state confirmation for each bypass circuit 400 according to the feedback signal. Further, any one of the power modules sends, to the communicable power module of the power module, the feedback signal of the bypass circuit 400 corresponding to the power module, the communicable power module of the power module sends, to the main control system 300, the feedback signal of the bypass circuit 400 corresponding to the power module, and the main control system 300 makes a state confirmation for each bypass circuit 400 according to the feedback signal. Any one of the power modules also receives feedback signals of the bypass circuits 400 corresponding to other power modules sent by the other power modules, and sends the feedback signals of the bypass circuits 400 corresponding to the other power modules to the main control system 300, and the main control system 300 makes a state confirmation for each bypass circuit 400 according to the feedback signals. Other power modules are communicable power modules of the power module.

The main control system 300 determines, according to the feedback signal, whether the faulty power module that needs to be bypassed has been bypassed, and generates a start/stop command according to whether the faulty power module has been bypassed, and the start/stop command is used for controlling the cascade converter to restart or stop.

For convenience of description, the bypass circuit 400 corresponding to the power module SM1 is referred to as bypass circuit Ki, where i is a positive integer and $1<i<n$; the bypass circuit 400 corresponding to the power module SM1 is referred to as bypass circuit K1; and the bypass circuit 400 corresponding to the power module SMN is referred to as bypass circuit KN.

An example is taken hereunder where the implementation manner of the communicable power module of the power module is as the first example. For the power module SM1, the power module SM1 sends the feedback signal of the bypass circuit Ki to the main control system 300, the power module SM1 also sends the feedback signal of the bypass circuit Ki to the power module SM(i−1) and the power module SM(i+1), the power module SM(i−1) sends the feedback signal of the bypass circuit Ki to the main control system 300 and the power module SM(i+1) sends the feedback signal of the bypass circuit Ki to the main control system 300.

For the power module SM1, the power module SM1 sends the feedback signal of the bypass circuit K1 to the main control system 300, and the power module SM1 also sends the feedback signal of the bypass circuit K1 to the power module SM2, the power module SM2 sends the feedback signal of the bypass circuit K1 to the main control system 300. For the power module SMN, the power module SMN sends the feedback signal of the bypass circuit KN to the main control system 300, the power module SMN also sends the feedback signal of the bypass circuit KN to the power module SM(N−1), and the power module SM(N−1) sends the feedback signal of the bypass circuit KN to the main control system 300.

When the main control system 300 receives the feedback signals of the bypass circuits K1 to KN, it determines whether the faulty power module that needs to be bypassed has been bypassed, and generates a start/stop command according to whether the faulty power module has been bypassed. For example, if a fault that may be bypassed occurs on the power module SM3, it is determined, according to the feedback signal of the bypass circuit K3, whether the power module SM3 is bypassed, and then a start/stop command is generated according to the power module SM3 has been bypassed or not been bypassed.

The feedback signal transmission paths in the case that the communicable power module of each power module is the second example or other examples, are similar to the feedback signal transmission paths of the first example, and will not be repeated here.

In the above solution, the feedback signal of the bypass circuit 400 of each power module may be transmitted to the main control system 300 through a plurality of paths, thereby improving the reliability of transmission of the feedback signal and the operation reliability of the cascade converter.

Figure 7:
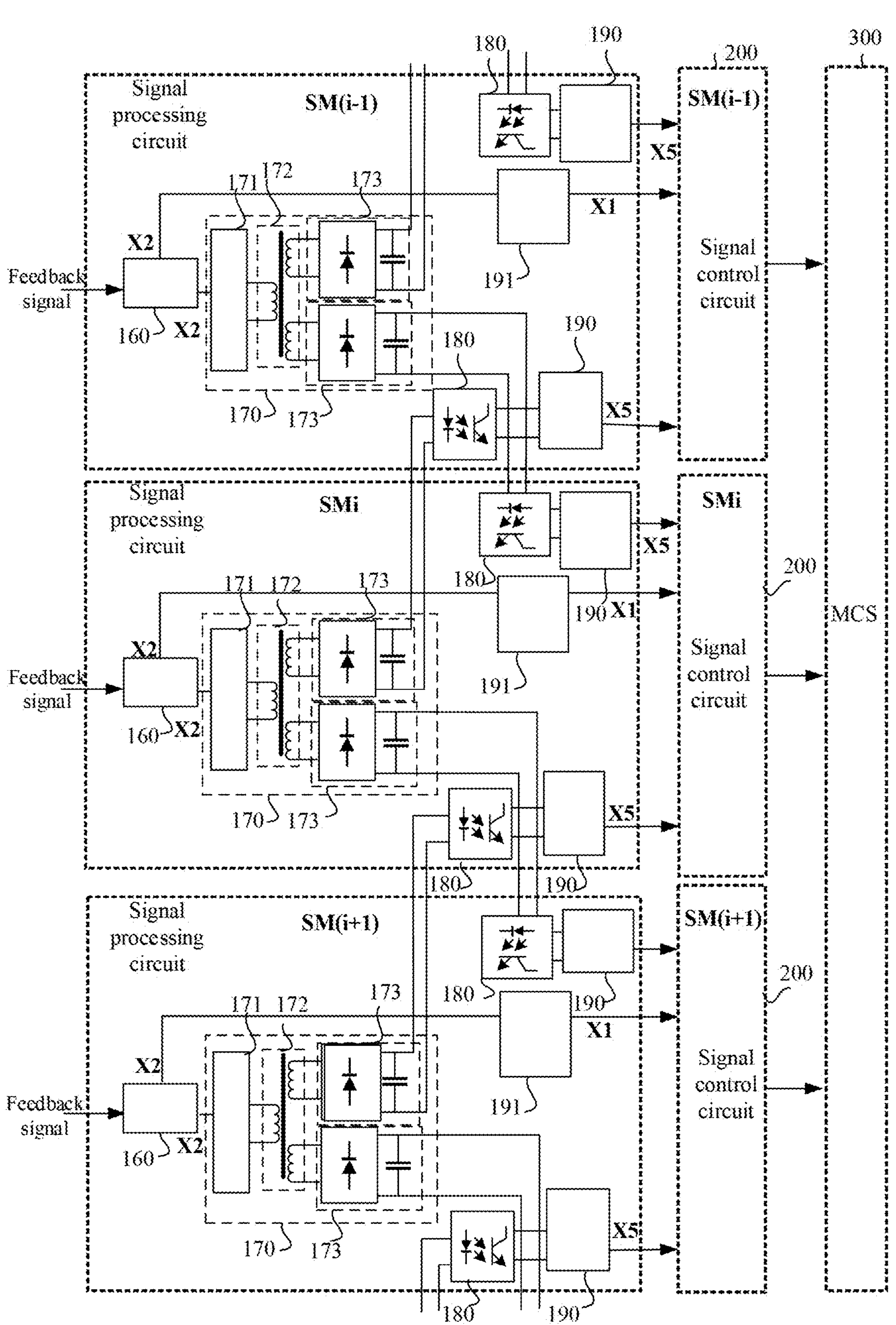
FIG. 7 is a schematic diagram of a partial circuit of a cascade converter provided by another embodiment of the present application.

Referring to FIG. 7, more specifically, the signal processing circuit 100 of each power module receives the feedback signal of the corresponding bypass circuit 400, generates a first detection signal X1 according to the feedback signal and transmits it to the signal control circuit 200 of the power module, and the signal control circuit 200 of the power module encodes the first detection signal X1 and then outputs it to the main control system 300, the main control system 300 makes a state confirmation for each bypass circuit 400 according to the encoded first detection signal X1.

The signal processing circuit 100 of each power module further generates a second detection signal X2 according to the feedback signal, and the second detection signal X2, after being subjected to isolation processing, is output to the signal processing circuit 100 of the communicable power module of the power module, and is output to the main control system 300 through the signal control circuit 200 of the communicable power module.

The feedback signal transmission path is described below by taking an example where the implementation manner of the communicable power module of the power module is as the first example. For the power module SM1, there are 3 feedback signal transmission paths, so that the main control system 300 may receive feedback signals of three bypass circuits.

Feedback signal transmission path 1: after the signal processing circuit 100 of the power module SM1 performs level matching processing on the feedback signal of the bypass circuit Ki, the feedback signal is directly transmitted to the signal control circuit 200 of the power module SM1, and after being encoded by the signal control circuit 200 of the power module SM1, it is sent to the main control system 300 in an optical fiber transmission mode.

Feedback signal transmission path 2: after the signal processing circuit 100 of the power module SM1 performs isolation processing on the feedback signal of the bypass circuit Ki, the feedback signal is sent to the signal processing circuit 100 of the power module SM(i−1); and the signal processing circuit 100 of the power module SM(i−1) processes the feedback signal and then transmits it to the signal control circuit 200 of the power module SM(i−1); and after being subjected to encoding processing from the signal control circuit 200 of the power module SM(i−1), the feedback signal is transmitted to the main control system 300 through the optical fiber.

Feedback signal transmission path 3: after the signal processing circuit 100 of the power module SM1 performs isolation processing on the feedback signal of the bypass circuit Ki, the feedback signal is sent to the signal processing circuit 100 of the power module SM(i+1); and the signal processing circuit 100 of the power module SM(i+1) processes the feedback signal and then transmits it to the signal control circuit 200 of the power module SM(i+1); and after being subjected to encoding processing from the signal control circuit 200 of the power module SM(i+1), the feedback signal is transmitted to the main control system 300 through the optical fiber.

For the power module SM1, there are 2 feedback signal transmission paths, so that the main control system 300 may receive two feedback signals of the bypass circuit K1. A first feedback signal transmission path is similar to the feedback signal transmission path 1 of the power module SM1, and will not be described here. A second feedback signal transmission path is similar to the feedback signal transmission path 3 of the power module SM1, and will not be described here.

For the power module SMN, there are 2 feedback signal transmission paths, so that the main control system 300 may receive two feedback signals of the bypass circuit KN. A first feedback signal transmission path is similar to the feedback signal transmission path 1 of the power module SM1, and will not be described here. A second feedback signal transmission path is similar to the feedback signal transmission path 2 of the power module SM1, and will not be described here.

The feedback signal transmission paths when the specific implementation manner of the communicable power module of the power module is the second example, are similar to the feedback signal transmission paths in the first example, and will not be repeated here.

In the above technical solution, the main control system 300 may receive at least two feedback signals of the bypass circuit Ki, at least two feedback signals of the bypass circuit K1, or at least two feedback signals of the bypass circuit KN; the main control system 300 determines, based on the at least two feedback signals of the bypass circuit Ki, whether the power module SM1 has been bypassed when the fault that may be bypassed occurs on the power module SM1, determines, based on the at least two feedback signals of the bypass circuit K1, whether the power module SM1 has been bypassed when the fault that may be bypassed occurs on the power module SM1, determines, based on the at least two feedback signals of the bypass circuit KN, whether the power module SMN has been bypassed when the fault that may be bypassed occurs on the power module SMN, and according to whether it has been bypassed or not, performs start/stop processing on the cascade conversion system, thus the reliability of the system can be improved.

In each power module, the signal control circuit 200 also needs to realize the following functions: firstly, receive the feedback signal of the bypass circuit 400 corresponding to the power module sent by the signal processing circuit 100 of the power module, encodes the feedback signal and then sends it to the main control system 300 by means of the optical fiber; secondly, receive the feedback signals of the bypass circuits 400 corresponding to other power modules sent by the signal processing circuit 100 of the power module, encodes the feedback signals and then sends them to the main control system 300 by means of the optical fiber, and the other power modules are communicable power modules of the power module.

In each power module, the signal processing circuit 100 needs to realize the following functions: firstly, detect the working state of the bypass circuit 400 of the power module and outputs the feedback signal, more specifically, detect the switching state or the power supply state of the bypass circuit 400 of the power module; secondly, transmit the feedback signal of the bypass circuit 400 of the power module to the signal control circuit 200 of the power module; thirdly, transmit the state of the bypass circuit 400 of the power module to the signal processing circuit(s) 100 of the communicable power module(s) of the power module.

The specific structure of the signal processing circuit 100 is designed based on the above description. Here, the structure of the signal processing circuit 100 is merely exemplarily described.

As shown in FIG. 7, the signal processing circuit 100 in each power module further includes a state detection circuit 160 and a third level matching circuit 191. An input end of the state detection circuit 160 receives the feedback signal of the bypass circuit 400 corresponding to the power module, and an output end of the state detection circuit 160 is connected to an input end of the third level matching circuit 191. The state detection circuit 160 is configured to perform state identification on the feedback signal of the bypass circuit 400 corresponding to the power module and output the second detection signal X2 of the bypass circuit 400 corresponding to the power module. The third level matching circuit 191 is configured to perform level matching on the second detection signal X2 of the bypass circuit 400 corresponding to the power module, and then output the first detection signal X1 of the bypass circuit 400 corresponding to the power module to the signal control circuit 200 of the power module.

The signal processing circuit 100 in each power module further includes a second transmission circuit 170, where the second transmission circuit 170 is configured to perform isolation processing on the second detection signal X2 of the bypass circuit 400 corresponding to the power module and then output it to the signal processing circuit(s) 100 of the communicable power module(s) of the power module.

The signal processing circuit 100 in each power module further includes a second signal conversion circuit 180 and a second level matching circuit 190. An input end of the second signal conversion circuit 180 receives the second detection signal X2 sent by the signal processing circuit 100 of the communicable power module of the power module. The second detection signal X2 is the detection signal of the bypass circuit 400 corresponding to the communicable power module of the power module. The second signal conversion circuit 180 performs signal conversion processing on the second detection signal X2 and then outputs it to the second level matching circuit 190, and the second level matching circuit is configured to perform level matching on the signal and then output the fifth detection signal X5 to the signal control circuit 200 of the power module.

The number of second signal conversion circuits 180 and the second level matching circuits 190 is configured based on the number of communicable power modules of the power module as other power modules. The number of second transmission circuits 170 is configured according to the number of communicable power modules of the power module. It may also be that the same second transmission circuit 170 sends the detection signal to each communicable power module.

The configuration manner of the number of second signal conversion circuits 180 and the number of second level matching circuits 190 in the signal processing circuit 100 of the power module SM1 is described below by taking an example where the implementation manner of the communicable power module of the power module is as the first example.

As shown in FIG. 7, for the power module SM1, it is the communicable power module of the power module SM(i−1) and the power module SM(i+1). That is, one power module serves as a communicable power module of two power modules, and receives detection signals of bypass circuits corresponding to the two power modules sent by the two power modules.

The signal processing circuit 100 of the power module SM1 includes two second signal conversion circuits 180 and two second level matching circuits 190. One of the second signal conversion circuits 180 is connected to the second transmission circuit 170 in the signal processing circuit 100 of the power module SM(i−1), and receives the second detection signal X2 corresponding to the bypass circuit K (i−1) transmitted by the second transmission circuit 170 in the signal processing circuit 100 of the power module SM(i−1), and the second detection signal X2 is output to the signal control circuit 200 of the power module SM1 after being processed by the second level matching circuit 190.

The other one of the second signal conversion circuits 180 is connected to the second transmission circuit 170 in the signal processing circuit 100 of the power module SM(i+1), and receives the second detection signal X2 corresponding to the bypass circuit K (i+1) transmitted by the second transmission circuit 170 in the signal processing circuit 100 of the power module SM(i+1), and the second detection signal X2 is output to the signal control circuit 200 of the power module SM1 after being processed by the second level matching circuit 190.

The configuration manner of the number of second transmission circuits 170 in the signal processing circuit 100 of the power module SM1 is described below by taking an example where the implementation manner of the communicable power module of the power module is as the first example.

There are two communicable power modules for the power module SM1, that is, the power module SM1 needs to send the detection signal of the bypass circuit Ki to the two power modules. Two second transmission circuits 170 may be arranged to send the detection signal of the bypass circuit Ki to the two power modules respectively, or one second transmission circuit 170 may be arranged to send the detection signal of the bypass circuit Ki to the two power modules respectively.

As an implementation manner of the power module SM1, as shown in FIG. 7, when there is one second transmission circuit 170 in the power module SM1, the second transmission circuit 170 is provided with two output ends, and the second transmission circuit 170 has its first output end connected to the second signal conversion circuit 180 in the signal processing circuit 100 of the power module SM(i−1), and transmits the second detection signal X2 corresponding to the bypass circuit Ki to the second signal conversion circuit 180 in the signal processing circuit 100 of the power module SM(i−1). The second transmission circuit 170 has its second output end connected to the second signal conversion circuit 180 in the signal processing circuit 100 of the power module SM(i+1), and transmits the second detection signal X2 corresponding to the bypass circuit Ki to the second signal conversion circuit 180 in the signal processing circuit 100 of the power module SM(i+1).

As shown in FIG. 7, when each second transmission circuit 170 includes two output ends, the second transmission circuit 170 includes a second signal generation circuit 171, a second transformer 172 and two second rectifier circuits 173. The second signal generation circuit 171 has an input end which serves as an input end of the second transmission circuit 170, for receiving the second detection signal X2 of the bypass circuit Ki, an output end of the second signal generation circuit 171 is connected to a primary side of the second transformer 172, a first secondary side of the second transformer 172 is connected to the input end of the first second rectifier circuit 173, and an output end of the first second rectifier circuit 173 is one output end of the second transmission circuit 170. A second secondary side of the second transformer 172 is connected to an input end of the second second rectifier circuit 173, and an output end of the second second rectifier circuit 173 is the other output end of the second transmission circuit 170.

The second signal generation circuit 171 is configured to generate an alternate current signal, which may be a sinusoidal signal or a pulse signal. The second transformer 172 is configured to isolate the alternate current signal, and the second rectifier circuit 173 is configured to rectify the alternate current signal into a direct current signal and output it. For the second signal generation circuit 171 and the second rectifier circuit 173, the existing structures may be used, which are not described here. In this way, isolated transmission of the second detection signal X2 may be realized.

Figure 8:
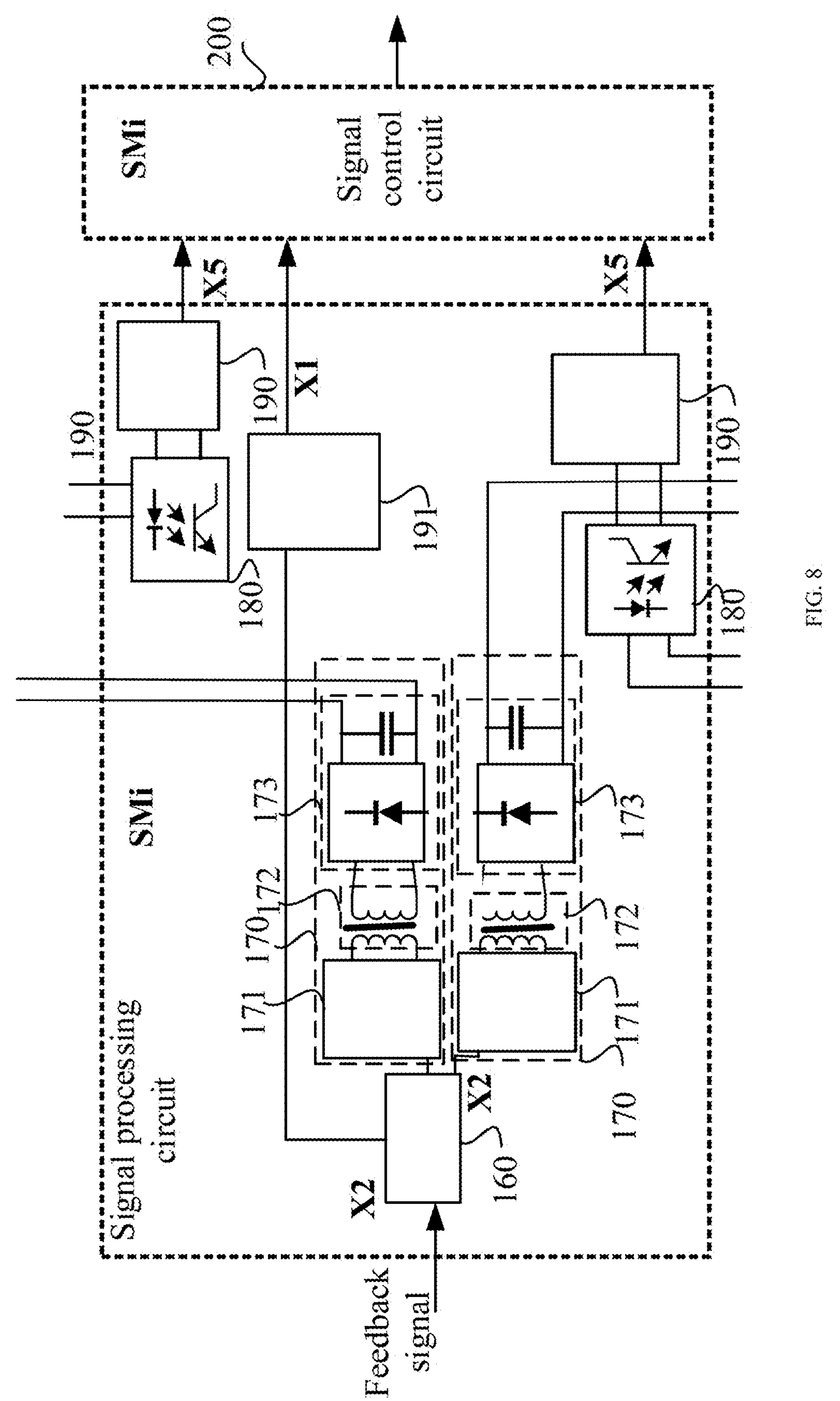
FIG. 8 is a schematic diagram of a partial circuit of a cascade converter provided by yet another embodiment of the present application.

As another implementation manner of the power module SM1, as shown in FIG. 8, there may be two second transmission circuits 170 in the power module SM1, and each second transmission circuit 170 includes one output end. One of the second transmission circuits 170 is connected to the second signal conversion circuit 180 in the signal processing circuit 100 of the power module SM(i−1), and transmits the second detection signal X2 corresponding to the bypass circuit Ki to the second signal conversion circuit 180 in the signal processing circuit 100 of the power module SM(i−1). The other one of the second transmission circuits 170 is connected to the second signal conversion circuit 180 in the signal processing circuit 100 of the power module SM(i+1), and transmits the second detection signal X2 corresponding to the bypass circuit Ki to the second signal conversion circuit 180 in the signal processing circuit 100 of the power module SM(i+1).

As shown in FIG. 8, when each second transmission circuit 170 includes one output end, the second transmission circuit 170 includes a second signal generation circuit 171, a second transformer 172 and a second rectifier circuit 173. An input end of the second signal generation circuit 171 serves as an input end of the second transmission circuit 170, an output end of the second signal generation circuit 171 is connected to a primary side of the second transformer 172, a secondary side of the second transformer 172 is connected to an input end of the second rectifier circuit 173, and an output end of the second rectifier circuit 173 is the output end of the second transmission circuit 170.

The configuration manner of the number of second signal conversion circuits 180 and the number of second level matching circuits 190 in the signal processing circuit 100 of the power module SM1 is described below by taking an example where the implementation manner of the communicable power module of the power module is as the first example.

Figure 9:
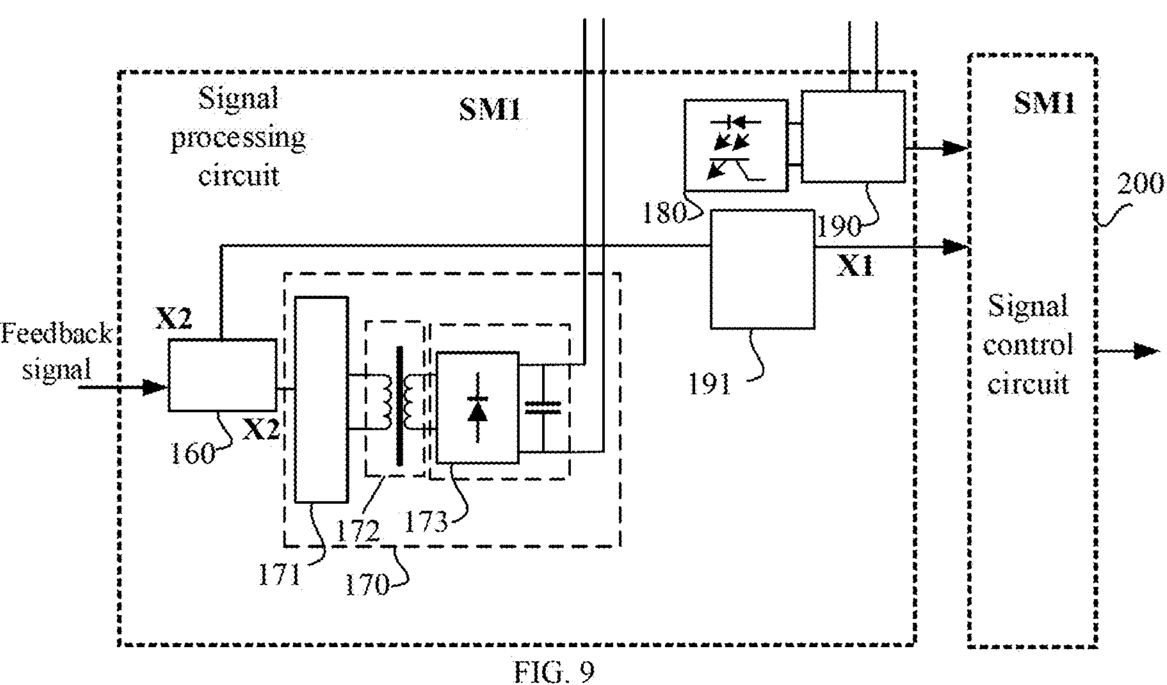
FIG. 9 is a schematic diagram of a partial circuit of a cascade converter provided by an embodiment of the present application.

As shown in FIG. 9, since the power module SM1 has one communicable power module, the signal processing circuit 100 includes one second signal conversion circuit 180 and one second level matching circuit 190. The second signal conversion circuit 180 is connected to the second transmission circuit 170 in the signal processing circuit 100 of the power module SM2, and receives the second detection signal X2 corresponding to the bypass circuit K2 transmitted by the second transmission circuit 170 in the signal processing circuit 100 of the power module SM2, and the second detection signal X2 is outputs to the signal control circuit 200 of the power module SM1 after being processed by the second level matching circuit 190.

The configuration manner of the number of second transmission circuits 170 in the signal processing circuit 100 of the power module SM1 is described below by taking an example where the implementation manner of the communicable power module of the power module is as the first example.

As shown in FIG. 9, the power module SM1 is only a communicable power module of the power module SM2, and there is one second transmission circuit 170 in the power module SM1, and the second transmission circuit 170 includes one output end. The second transmission circuit 170 is connected to the second signal conversion circuit 180 in the signal processing circuit 100 of the power module SM2, and transmits the second detection signal X2 corresponding to the bypass circuit K1 to the second signal conversion circuit 180 in the signal processing circuit 100 of the power module SM2.

In the above technical solution, the signal processing circuit 100 includes a second transmission circuit, a second signal conversion circuit and a second level matching circuit. The number of second transmission circuits, second signal conversion circuits and second level matching circuits is adjusted to adapt to the situation where each power module corresponds to a different number of communicable power modules. Signal isolation is realized by the second transmission circuit, and the second signal conversion circuit and the second level matching circuit are further used for signal transmission to ensure the reliability of transmission, and signal isolation can avoid noise introduction.

More specifically, the feedback signal of the bypass circuit 400 includes the switch signal of the main switch in the bypass circuit 400 or the power supply signal of the bypass circuit 400. Based on this, three implementation manners of the state detection circuit 160 are provided.

In some embodiments, the state detection circuit 160 generates the second detection signal X2 based on the switch signal of the main switch in the bypass circuit 400 and the power supply signal of the bypass circuit 400.

Figure 10:
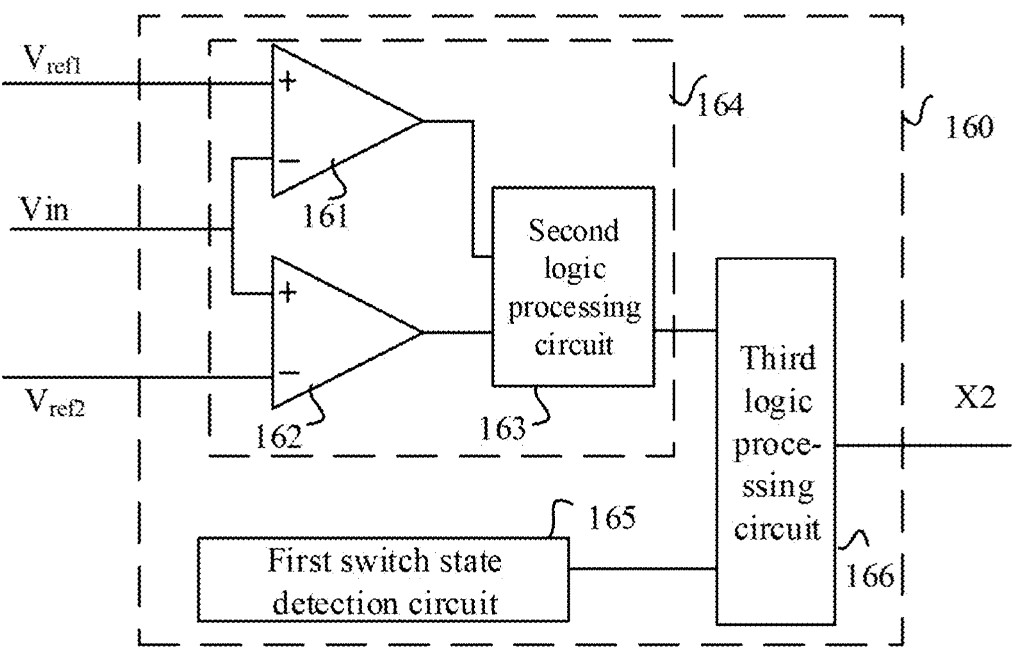
FIG. 10 is a schematic circuit diagram of a state detection circuit provided by an embodiment of the present application.

As shown in FIG. 10, the state detection circuit 160 includes a first switch state detection circuit 165, a first power supply state detection circuit 164 and a third logic processing circuit 166. The first switch state detection circuit 165 is connected to the bypass circuit 400, and the first switch state detection circuit 165 is configured to acquire the switch signal of the main switch in the bypass circuit 400 and output a third detection signal according to the switch signal. The first power supply state detection circuit 164 is connected to the bypass circuit 400, and the first power supply state detection circuit 164 acquires the power supply signal of the bypass circuit 400 and outputs a fourth detection signal according to the power supply signal of the bypass circuit 400. An input end of the third logic processing circuit 166 is connected to an output end of the first switch state detection circuit 165, an input end of the third logic processing circuit 166 is connected to an output end of the first power supply state detection circuit 164, and the third logic processing circuit 166 performs logical operation on the third detection signal and the fourth detection signal to output the second detection signal X2.

When the switch signal of the main switch in the bypass circuit 400 indicates opening, the third detection signal is the low-level signal; and when the switch signal of the main switch in the bypass circuit 400 indicates closing, the third detection signal is the high-level signal. When the power supply signal of the bypass circuit 400 indicates abnormal power supply, the fourth detection signal is the low-level signal; and when the power supply signal of the bypass circuit 400 indicates normal power supply, the fourth detection signal is the high-level signal. When the third detection signal and the fourth detection signal are high-level signals, the second detection signal X2 output by the third logic processing circuit 166 is at a high level, indicating that the bypass circuit 400 has bypassed the corresponding power module. When the third detection signal and/or the fourth detection signal are low-level signals, the second detection signal X2 output by the third logic processing circuit 166 is at a low level, indicating that the bypass circuit 400 has not bypassed the corresponding power module.

The control logic of the state detection circuit 160 is not limited to the above mode. It may also be that when the switch signal of the main switch in the bypass circuit 400 indicates opening, the third detection signal is the high-level signal, and when the switch signal of the main switch in the bypass circuit 400 indicates closing, the third detection signal is the low-level signal; when the power supply signal of the bypass circuit 400 indicates abnormal power supply, the fourth detection signal is the high-level signal, and when the power supply signal of the bypass circuit 400 indicates normal power supply, the fourth detection signal is the low-level signal. When both the third detection signal and the fourth detection signal are low-level signals, the second detection signal X2 output by the third logic processing circuit 166 is at a high level, indicating that the bypass circuit 400 has bypassed the corresponding power module. When the third detection signal and/or the fourth detection signal are high-level signals, the second detection signal X2 output by the third logic processing circuit 166 is at a low level, indicating that the bypass circuit 400 has not bypassed the corresponding power module.

More specifically, the normal power supply refers to that the power supply terminal voltage of the bypass circuit 400 is within a preset range. As shown in FIG. 10, the first power supply state detection circuit 164 includes a first comparator 161, a second comparator 162 and a second logic processing circuit 163. The first comparator 161 receives, at its first input end, a lower limit value Vref1 of a preset range; the first comparator 161 receives, at its second input end, a power supply terminal voltage Vin of the bypass circuit 400; and the first comparator 161 has its output end connected to an input end of the second logic processing circuit 163. The second comparator 162 receives, at its second input end, an upper limit value Vref2 of a preset range; the second comparator 162 has its first input end connected to the second input end of the first comparator 161; the second comparator 162 has its output end connected to the input end of the second logic processing circuit 163, and an output end of the second logic processing circuit 163 serves as the output end of the first power supply state detection circuit 164. When the output signal of the first comparator 161 indicates that the power supply terminal voltage of the bypass circuit 400 is greater than the lower limit value Vref1 of the preset range, and the output signal of the second comparator 162 indicates that the power supply terminal voltage of the bypass circuit 400 is less than the upper limit value Vref2 of the preset range, the second logic processing circuit 163 outputs the second detection signal X2 at a high level, indicating that the power supply signal of the bypass circuit 400 indicates normal power supply. When the output signal of the first comparator 161 indicates that the power supply terminal voltage of the bypass circuit 400 is less than the lower limit value Vref1 of the preset range, or when the output signal of the second comparator 162 indicates that the power supply terminal voltage of the bypass circuit 400 is greater than the upper limit value Vref2 of the preset range, the second logic processing circuit 163 outputs the second detection signal X2 at a low level, and the power supply signal of the bypass circuit 400 indicates abnormal power supply.

In some examples, the state detection circuit outputs the second detection signal X2 only based on the switch signal of the main switch in the bypass circuit 400. The state detection circuit includes a second switch state detection circuit. The second switch state detection circuit is connected to the bypass circuit 400, and is configured to acquire the switch signal of the main switch in the bypass circuit 400 and output the second detection signal X2 according to the switch signal. More specifically, the magnitude of the voltage of the second detection signal may be used for reflecting the state of the main switch. When the switch signal of the main switch in the bypass circuit 400 indicates opening, the second detection signal is the low-level signal; and when the switch signal of the main switch in the bypass circuit 400 indicates closing, the second detection signal is the high-level signal. The signal logic of the second switch state detection circuit is not limited here. It may also be that when the switch signal of the main switch in the bypass circuit 400 indicates opening, the second detection signal is the high-level signal, and when the switch signal of the main switch in the bypass circuit 400 indicates closing, the second detection signal is the low-level signal.

In some examples, the state detection circuit outputs the second detection signal only based on the power supply signal of the bypass circuit 400. The state detection circuit includes a second power supply state detection circuit. The second power supply state detection circuit is connected to the bypass circuit 400, and is configured to acquire the power supply signal of the bypass circuit 400 and output the second detection signal according to the power supply signal of the bypass circuit 400. More specifically, the magnitude of the voltage of the second detection signal may be used for reflecting the power supply. When the power supply signal of the bypass circuit 400 indicates abnormal power supply, the second detection signal is the low-level signal, and when the power supply signal of the bypass circuit 400 indicates normal power supply, the second detection signal is the high-level signal. The signal logic of the second power supply state detection circuit is not limited here. It may also be that when the power supply signal of the bypass circuit 400 indicates abnormal power supply, the second detection signal is the high-level signal, and when the power supply signal of the bypass circuit 400 indicates normal power supply, the second detection signal is the low-level signal.

A control method of the cascade converter is described below by taking an example where the specific implementation manner of the communicable power module of the power module is as the first example. The control method of the cascade converter specifically includes the following steps.

S301, the main control system 300 receives feedback signals of the bypass circuits K1 to KN uploaded by the power modules SM1 to SMN.

In this step, the signal processing circuit 100 of the power module SM1 detects the switch signal of the main switch in the bypass circuit Ki or the power supply signal of the bypass circuit Ki and outputs it as the feedback signal of the bypass circuit Ki.

The feedback signal of the bypass circuit Ki is transmitted to the main control system 300 through three feedback signal transmission paths.

The specific process of transmitting the feedback signal of the bypass circuit Ki through the first feedback signal transmission path includes S221 to S223:

- S221, the feedback signal of the bypass circuit Ki is processed by level matching into a direct current feedback signal that may be directly used for transmission;
- S222, the signal processing circuit 100 of the power module SM1 sends the direct current feedback signal to the signal control circuit 200 of the power module SM1;
- S223, after encoding the direct current feedback signal, the signal control circuit 200 sends it to the main control system 300 via the optical fiber.

The specific process of transmitting the feedback signal of the bypass circuit Ki through the second feedback signal transmission path includes S231 to S233:

- S231, the feedback signal of the bypass circuit Ki triggers the second signal generation circuit 171 of the signal processing circuit 100 of the power module SM1 to generate the alternate current signal, and the alternate current signal, after being isolated by a single-level or multi-level transformer, is converted into a first direct current feedback signal by the second rectifier circuit 173, and the first direct current feedback signal is sent to the signal processing circuit 100 of the power module SM(i−1);
- S232, the signal processing circuit 100 of the power module SM(i−1) processes, through the second signal conversion circuit 180, the first direct current feedback signal corresponding to the bypass circuit Ki sent by the signal processing circuit 100 of the power module SM1, and the signal is processed by level matching into a second direct current feedback signal that may be directly used for transmission;
- S233, the signal processing circuit 100 of the power module SM(i−1) sends the second direct current feedback signal to the signal control circuit 200 of the power module SM(i−1);
- S234: after encoding the second direct current feedback signal, the signal control circuit 200 of the power module SM(i−1) sends it to the main control system 300 via the optical fiber.

The specific process of transmitting the feedback signal of the bypass circuit Ki through the third feedback signal transmission path includes S241 to S244:

- S241, the feedback signal of the bypass circuit Ki triggers the second signal generation circuit 171 of the signal processing circuit 100 of the power module SM1 to generate the alternate current signal, and the alternate current signal, after being isolated by a single-level or multi-level transformer, is converted into a first direct current feedback signal by the second rectifier circuit 173, and the first direct current feedback signal is sent to the signal processing circuit 100 of the power module SM(i+1);
- S242, the signal processing circuit 100 of the power module SM(i+1) processes, through the second signal conversion circuit 180, the first direct current feedback signal corresponding to the bypass circuit Ki sent by the signal processing circuit 100 of the power module SM1, and the signal is processed by level matching into a second direct current feedback signal that may be directly used for transmission;
- S243, the signal processing circuit 100 of the power module SM(i+1) sends the second direct current feedback signal to the signal control circuit 200 of the power module SM(i+1);
- S244: after encoding the second direct current feedback signal, the signal control circuit 200 of the power module SM(i+1) sends it to the main control system 300 via the optical fiber.

For the power module SM1, the feedback signal of the bypass circuit K1 is transmitted to the main control system 300 through two feedback signal transmission paths.

The process of transmission over the first feedback signal transmission path for the feedback signal of the bypass circuit K1 is similar to that over the first feedback signal transmission path for the feedback signal of the bypass circuit Ki, and will not be described here.

The process of transmission over the second feedback signal transmission path for the feedback signal of the bypass circuit K1 is similar to that over the third feedback signal transmission path for the feedback signal of the bypass circuit Ki, and will not be described here.

For the power module SMN, the feedback signal of the bypass circuit KN is transmitted to the main control system 300 through two feedback signal transmission paths.

The process of transmission over the first feedback signal transmission path for the feedback signal of the bypass circuit KN is similar to that over the first feedback signal transmission path for the feedback signal of the bypass circuit Ki, and will not be described here.

The process of transmission over the second feedback signal transmission path for the feedback signal of the bypass circuit KN is similar to that over the second feedback signal transmission path for the feedback signal of the bypass circuit Ki, and will not be described here.

S302, the main control system 300 judges whether a waiting time t for receiving the state of the bypass circuit 400 is greater than a preset time threshold: if yes, turn to S304; if no, turn to S303.

The judged waiting time t is the time starting from sending the bypass drive signal of the bypass circuit 400 to transmitting the feedback signal to the main control system 300, which is mainly influenced by the signal transmission time and the state detection time when the bypass circuit 400 is closed.

S303, the main control system 300 continues to receive the feedback signals of the bypass circuits K1 to KN uploaded by the power modules SM1 to SMN; and return to S302.

S304, determine, according to the feedback signal, whether the faulty power module that needs to be bypassed has been bypassed, and generate a start/stop command according to whether the faulty power module has been bypassed.

More specifically, if the power module on which a fault occurs is the power module SM1, the main control system 300 determines, according to the feedback signals of the bypass circuit K1 uploaded by the power modules SM1 and SM2, whether the bypass circuit K1 bypasses the power module SM1.

If the power module on which a fault occurs is the power module SM1, the main control system 300 determines, according to the feedback signals of the bypass circuit Ki uploaded by the power modules SM1, SM(i−1) and SM(i+1), whether the bypass circuit Ki bypasses the power module SM1.

If the power module on which a fault occurs is the power module SMN, the main control system 300 determines, according to the feedback signals of the bypass circuit KN uploaded by the power modules SMN and SM(N−1), whether the bypass circuit KN bypasses the power module SMN.

It should also be noted here that whether the power module SM1 is bypassed is determined based on the feedback signal of the bypass circuit Ki of the power module SM1, which may also be determined by the signal control circuit 200, and the signal control circuit 200 sends the determined result to the main control system 300.

S305, when it is determined that the faulty power module that needs to be bypassed has been bypassed, a start command is generated. When it is determined that not all faulty power modules that need to be bypassed have been bypassed, a stop command is generated.

In the above technical solution, a plurality of feedback signal transmission paths are selected to transmit the feedback signal of the bypass circuit 400, and the main control system 300 judges whether the bypass of the faulty power module is successful through the feedback signal of the bypass circuit 400, which greatly improves the reliability of the bypass of the power module SM1.

Figure 11:
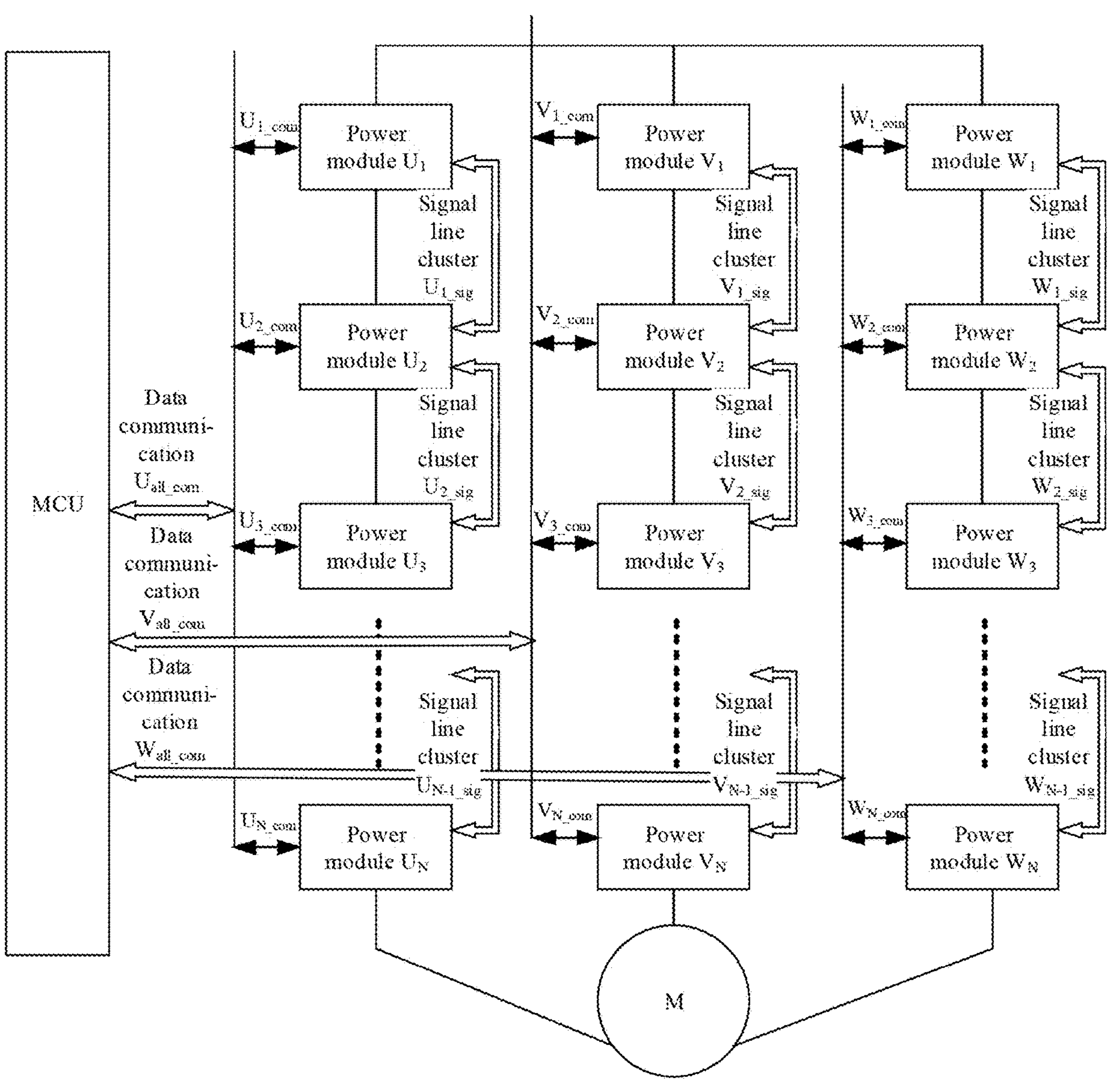
FIG. 11 is a schematic diagram of a cascade converter provided by yet another embodiment of the present application.

The cascade converters shown in FIG. 2 to FIG. 9 are single-phase cascade converters. As shown in FIG. 11, the cascade converter system includes three cascade converters. The three cascade converters may share the main control system 300 or use their respective main control systems 300 separately. The three cascade converters are U-phase cascade converter, V-phase cascade converter and W-phase cascade converter in turn. N power modules in the U-phase cascade converter are power module U1, power module U2, . . . , and power module UN. The power module U1 and the first port of the power module U2 are connected in series. The power module U1 is connected to U-phase bus signal line Uall_com through signal line U1_com, the U-phase bus signal line Uall_com is connected to the main control system 300, the power module U1 may receive information from the main control system 300, and the main control system 300 may also receive information from the power module U1. The power module U1 and the power module U2 are connected through the signal line U1_sig, and may send signals to each other through the signal line U1_sig, and the power module U1 and the power module U2 are communicable power modules to each other. The power module U2 and the power module U3 are connected through the signal line U2_sig, and may send signals to each other through the signal line U2_sig, and the communicable power modules of the power module U2 are the power module U1 and the power module U3. The connection relationships of power modules U3, . . . and UN are analogized in turn, and will not be repeated here. Here, the relationship between individual power modules is only exemplarily described. The V-phase cascade converter and the W-phase cascade converter are the same as the U-phase cascade converter and will not be repeated here.

By comprehensively considering the control cost, bypass range, reliability and other issues of the bypass of the faulty power module, the present application proposes a bypass solution that the faulty power module is bypassed through a plurality of bypass command transmission paths and the state of the bypass circuit 400 is fed back through a plurality of feedback signal transmission paths, and the solution has the advantages of low control cost, high reliability, wide fault bypass range, no limitation on the number of power modules and application of both the single-phase and three-phase systems.

Other embodiments of the present application will become readily conceivable to those skilled in the art from consideration of the specification and practice of the invention disclosed herein. The present application is intended to cover any variations, uses, or adaptations of the present application following the general principles of the present application and including common knowledge or common technical means in the art not disclosed in the present application. The specification and embodiments are to be regarded as exemplary only, with the true scope and spirit of the present application being indicated by the following claims.

It should be understood that the present application is not limited to the precise structure described above and shown in the accompanying drawings, and various modifications and changes may be made without departing from the scope thereof. The scope of the present application is only subject to the appended claims.

What is claimed is:

1. A cascade converter, comprising:

a main control system, a plurality of power modules, and a bypass circuit corresponding to each power module;

wherein the main control system is communicatively connected to each power module, the power modules are electrically connected in turn, and any one of the power modules has at least one communicable power module, the communicable power module is an else power module communicatively connected to the power module, and the number of power modules spaced apart is within a preset value;

when the power module is faulted, the power module on which a fault occurs is a faulty power module, the faulty power module sends a fault signal to the main control system;

the main control system generates a bypass command according to the fault signal and sends same to the faulty power module and the communicable power module of the faulty power module;

the communicable power module generates a first bypass signal according to the bypass command and outputs same to the faulty power module; the faulty power module controls, according to the bypass command and/or the first bypass signal, the corresponding bypass circuit to bypass the faulty power module.

2. The cascade converter according to claim 1, wherein each power module receives a feedback signal of the corresponding bypass circuit and sends the feedback signal to the main control system, the main control system makes a state confirmation for each bypass circuit according to the feedback signal.

3. The cascade converter according to claim 2, wherein the main control system determines, according to the feedback signal, whether the faulty power module that needs to be bypassed has been bypassed, and generates a start/stop command according to whether the faulty power module has been bypassed, the start/stop command is used for controlling the cascade converter to restart or stop.

4. The cascade converter according to claim 2, wherein the power module further receives a feedback signal of the corresponding communicable power module and sends same to the main control system.

5. The cascade converter according to claim 1, wherein each power module comprises a signal control circuit and a signal processing circuit;

the signal control circuit is electrically connected to the signal processing circuit, the signal processing circuit is electrically connected to the bypass circuit, and the signal control circuit is communicatively connected to the main control system; and signal processing circuits in two adjacent power modules are electrically connected;

the signal control circuit of the communicable power module of the faulty power module receives the bypass command sent by the main control system and transmits the bypass command to the signal processing circuit of the communicable power module, and the signal processing circuit of the communicable power module generates the first bypass signal and transmits same to the signal processing circuit of the faulty power module;

the signal control circuit of the faulty power module transmits the bypass command to the signal processing circuit of the faulty power module, and the signal processing circuit of the faulty power module generates a second bypass signal according to the bypass command and generates a bypass drive signal according to the first bypass signal or the second bypass signal.

6. The cascade converter according to claim 5, wherein the signal processing circuit comprises a first transmission circuit, a first signal conversion circuit and a first level matching circuit;

the first transmission circuit is connected to the signal control circuit of the power module, and is configured to perform isolation processing on the bypass command transmitted by the signal control circuit of the power module and output the first bypass signal to the signal processing circuit of the else power module;

the first signal conversion circuit is connected to the signal processing circuit of the else power module, and is configured to receive the first bypass signal output by the signal processing circuit of the else power module and perform signal conversion on the first bypass signal to output a third bypass signal;

the first level matching circuit is connected to the signal control circuit of the power module, and is configured to perform level matching on the bypass command transmitted by the signal control circuit of the power module and output a second bypass signal.

7. The cascade converter according to claim 6, wherein the signal processing circuit further comprises a first logic processing circuit and a drive circuit;

an input end of the first logic processing circuit is connected to an output end of the first signal conversion circuit, an input end of the first logic processing circuit is connected to an output end of the first level matching circuit, and the first logic processing circuit is configured to output a first trigger signal after performing logic operation on the second bypass signal and the third bypass signal;

an input end of the drive circuit is connected to an output end of the first logic processing circuit, and the drive circuit is configured to output the bypass drive signal under control of the first trigger signal.

8. The cascade converter according to claim 6, wherein the signal processing circuit of the power module further comprises: a plurality of drive circuits;

an output end of the first signal conversion circuit is connected to an input end of one of the drive circuits, for outputting the bypass drive signal under control of the third bypass signal;

an output end of the first level matching circuit is connected to an input end of one of the drive circuits, for outputting the bypass drive signal under control of the second bypass signal.

9. The cascade converter according to claim 6, wherein the first transmission circuit comprises a first signal generation circuit, a first transformer and a first rectifier circuit;

an input end of the first signal generation circuit power modules P available for operation s as an input end of the first transmission circuit, an output end of the first signal generation circuit is connected to a primary side of the first transformer, a secondary side of the first transformer is connected to an input end of the first rectifier circuit, an output end of the first rectifier circuit is an output end of the first transmission circuit.

10. The cascade converter according to claim 5, wherein the signal processing circuit of each power module receives the feedback signal of the corresponding bypass circuit, generates a first detection signal according to the feedback signal and transmits same to the signal control circuit of the power module, and the signal control circuit of the power module encodes the first detection signal and then outputs same to the main control system, the main control system makes a state confirmation for each bypass circuit according to the encoded first detection signal.

11. The cascade converter according to claim 10, wherein the signal processing circuit of each power module further generates a second detection signal according to the feedback signal, and the second detection signal is subjected to isolation processing and then output to the signal processing circuit of the communicable power module of the power module, and is output to the main control system through the signal control circuit of the communicable power module.

12. The cascade converter according to claim 10, wherein the signal processing circuit in each power module further comprises a state detection circuit and a third level matching circuit;

the state detection circuit receives, at an input end thereof, the feedback signal of the corresponding bypass circuit, an output end of the state detection circuit is connected to an input end of the third level matching circuit, the state detection circuit is configured to perform state identification on the feedback signal of the bypass circuit and output a second detection signal, and the third level matching circuit is configured to perform level matching on the second detection signal and then output the first detection signal to the signal control circuit of the power module.

13. The cascade converter according to claim 12, wherein the signal processing circuit in each power module further comprises a second transmission circuit, the second transmission circuit is configured to perform isolation processing on the second detection signal and then output same to the signal processing circuit of the communicable power module of the power module.

14. The cascade converter according to claim 12, wherein the state detection circuit comprises: a first switch state detection circuit, a first power supply state detection circuit and a third logic processing circuit;

the first switch state detection circuit is connected to the bypass circuit, and the first switch state detection circuit is configured to acquire a switch signal of a main switch in the bypass circuit and output a third detection signal according to the switch signal;

the first power supply state detection circuit is connected to the bypass circuit, the first power supply state detection circuit is configured to detect a power supply terminal voltage of the bypass circuit and output a fourth detection signal according to the power supply terminal voltage;

the third logic processing circuit is connected to an output end of the first switch state detection circuit, the third logic processing circuit is connected to an output end of the first power supply state detection circuit, and the third logic processing circuit performs logical operation on the third detection signal and the fourth detection signal to output the second detection signal.

15. The cascade converter according to claim 12, wherein the state detection circuit comprises: a second switch state detection circuit or a second power supply state detection circuit;

the second switch state detection circuit is connected to the bypass circuit, and the second switch state detection circuit is configured to acquire a switch signal of a main switch in the bypass circuit, and output the second detection signal according to the switch signal;

the second power supply state detection circuit is connected to the bypass circuit, the second power supply state detection circuit is configured to detect a power supply terminal voltage of the bypass circuit and output the second detection signal according to the power supply terminal voltage.

* * * * *